US011638292B2

United States Patent
Lee et al.

(10) Patent No.: US 11,638,292 B2
(45) Date of Patent: *Apr. 25, 2023

(54) METHOD AND APPARATUS FOR PERFORMING MODE 1 SL COMMUNICATION IN NR V2X

(71) Applicant: LG ELECTRONICS INC., Seoul (KR)

(72) Inventors: Seungmin Lee, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,593

(22) Filed: Oct. 11, 2022

(65) Prior Publication Data

US 2023/0037912 A1    Feb. 9, 2023

Related U.S. Application Data

(63) Continuation of application No. 17/704,861, filed on Mar. 25, 2022, now Pat. No. 11,503,632, which is a (Continued)

(30) Foreign Application Priority Data

Apr. 9, 2020    (KR) .......................... 10-2020-0043527

(51) Int. Cl.
  *H04W 4/00*    (2018.01)
  *H04W 72/23*    (2023.01)
  (Continued)

(52) U.S. Cl.
  CPC ............... *H04W 72/23* (2023.01); *H04L 1/08* (2013.01); *H04L 1/1812* (2013.01);
  (Continued)

(58) Field of Classification Search
  CPC ..... H04W 72/14; H04W 80/02; H04W 92/18; H04L 1/08; H04L 1/1812; H04L 5/0053
  (Continued)

(56) References Cited

U.S. PATENT DOCUMENTS 10,177,883 B2 *  1/2019  Kim ...................... H04L 1/1874
11,503,632 B2 * 11/2022  Lee ........................ H04W 72/14
  (Continued)

OTHER PUBLICATIONS

PCT International Application No. PCT/KR2021/004473, International Search Report dated Jun. 29, 2021, 2 pages.
(Continued)

*Primary Examiner* — Chuong T Ho
(74) *Attorney, Agent, or Firm* — Lee Hong Degerman Kang Waimey

(57) ABSTRACT

Provided are a method by which a first device performs wireless communication an apparatus for supporting same. The method may comprise: receiving, from the base station through a physical downlink control channel (PDCCH), a downlink control information (DCI) related to the SL HARQ process ID, wherein the DCI includes information related to a second SL grant for retransmission of the MAC PDU and information related to a second PUCCH resource, wherein, based on the buffer related to the SL HARQ process ID being flushed, the first device does not transmit the MAC PDU to the second device based on the second SL grant, and the first device does not transmit SL HARQ feedback information related to the MAC PDU to the base station based on the second PUCCH resource.

20 Claims, 22 Drawing Sheets

Related U.S. Application Data continuation of application No. PCT/KR2021/004473, filed on Apr. 9, 2021.

(51) Int. Cl.
| | | |
|---|---|---|
| *H04L 1/08* | (2006.01) | |
| *H04L 1/1812* | (2023.01) | |
| *H04L 5/00* | (2006.01) | |
| *H04W 80/02* | (2009.01) | |
| *H04W 92/18* | (2009.01) | |

(52) U.S. Cl.
CPC ........... *H04L 5/0053* (2013.01); *H04W 80/02* (2013.01); *H04W 92/18* (2013.01)

(58) Field of Classification Search
USPC ........................................ 370/329, 330, 328
See application file for complete search history.

(56) References Cited

U.S. PATENT DOCUMENTS

| | | | |
|---|---|---|---|
| 2017/0289995 A1* | 10/2017 | Lin .................. | H04W 72/0413 |
| 2019/0058986 A1 | 2/2019 | Loehr et al. | |
| 2020/0287665 A1 | 9/2020 | Lee et al. | |
| 2021/0045178 A1* | 2/2021 | Kung .................. | H04W 28/26 |
| 2021/0227465 A1 | 7/2021 | Kung et al. | |
| 2021/0314821 A1 | 10/2021 | Huang et al. | |
| 2021/0321396 A1 | 10/2021 | Li et al. | |
| 2021/0360685 A1 | 11/2021 | Huang et al. | |
| 2021/0377912 A1 | 12/2021 | El Hamss et al. | |
| 2022/0174774 A1 | 6/2022 | Tseng et al. | |
| 2022/0182192 A1 | 6/2022 | Lee | |
| 2022/0217766 A1 | 7/2022 | Lee et al. | |
| 2022/0337349 A1* | 10/2022 | Lee .......................... | H04L 5/00 |
| 2022/0353020 A1* | 11/2022 | Ganesan ............... | H04L 1/1854 |

OTHER PUBLICATIONS

3rd Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.8.0, Dec. 2019, 136 pages.

Huawei et al., "Discussion on HARQ support for NR sidelink," R2-1915968, 3GPP TSG-RAN WG2 #108, Nov. 2019, 6 pages.

Samsung, "NDI Toggling Aspects," R2-2000221, 3GPP TSG-RAN WG2 Meeting#109, Feb. 2020, 10 pages.

Huawei et al., "Remaining issues on Configured Grant," R2-2001033, 3GPP TSG-RAN WG2 Meeting #109 electronic, Mar. 2020, 7 pages.

Oppo, "Left issues on HARQ for NR-V2X," R2-2000196, 3GPP TSG-RAN WG2 Meeting #109 electronic, Mar. 2020, 9 pages.

U.S. Appl. No. 17/704,861, Office Action dated Jun. 13, 2022, 8 pages.

U.S. Appl. No. 17/704,861, Notice of Allowance dated Jul. 14, 2022, 9 pages.

* cited by examiner

FIG. 11
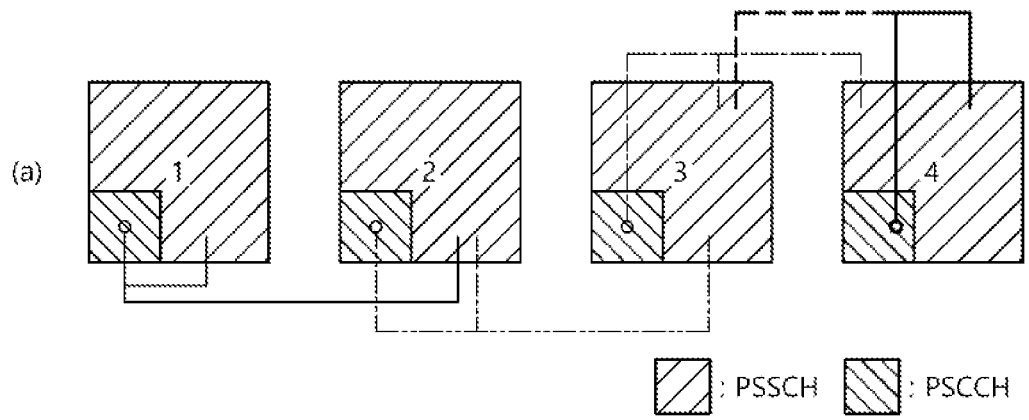
(a)
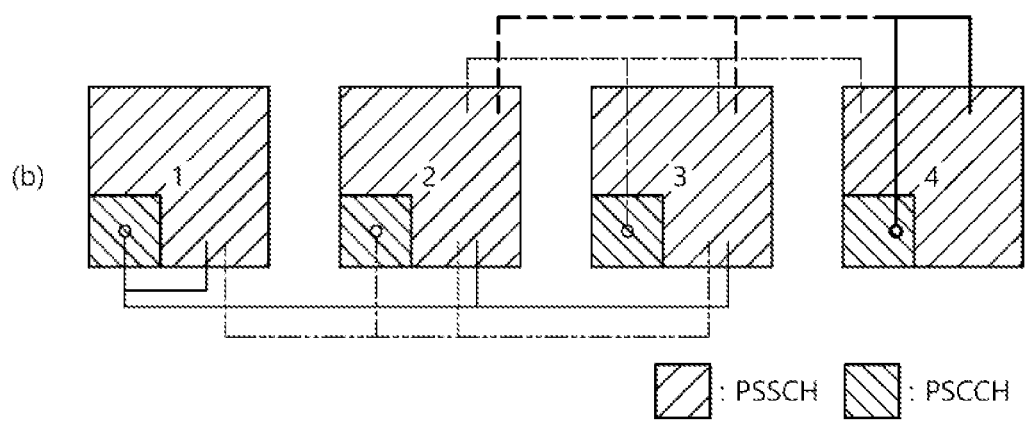
(b)
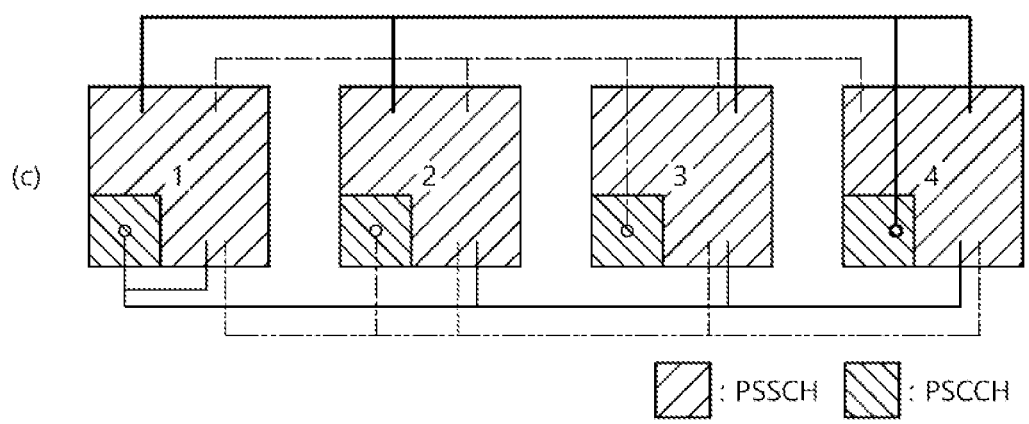
(c)

METHOD AND APPARATUS FOR PERFORMING MODE 1 SL COMMUNICATION IN NR V2X

CROSS-REFERENCE TO RELATED APPLICATIONS

This application is a continuation of U.S. patent application Ser. No. 17/704,861, filed on Mar. 25, 2022, which is a continuation of International Application No. PCT/KR2021/004473, filed on Apr. 9, 2021, which claims the benefit of earlier filing date and right of priority to Korean Application No. 10-2020-0043527, filed on Apr. 9, 2020, the contents of which are all hereby incorporated by reference herein their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY OF THE DISCLOSURE

Technical Objects

Meanwhile, a transmitting UE may perform SL communication based on resource(s) (e.g., SL configured grant (CG)) allocated by a base station. In this case, a method for the transmitting UE to operate a buffer of the associated SL HARQ process if the number of transmissions performed by the transmitting UE based on a specific SL CG reaches the pre-configured maximum number of transmissions related to the specific SL CG, a method for the transmitting UE to operate retransmission resource(s) related to a dynamic grant (DG) received from a base station after the transmitting UE reports NACK information (received from a receiving UE) to the base station based on a PUCCH resource related to the SL CG, a method for the transmitting UE to operate a PUCCH resource related to the retransmission resource(s), etc. needs to be clearly defined.

Technical Solutions

In one embodiment, provided is a method for performing wireless communication by a first device. The method may comprise: receiving, from a base station, information related to a first sidelink (SL) grant, information related to a first physical uplink control channel (PUCCH) resource, and information related to a maximum number of transmissions of a medium access control (MAC) protocol data unit (PDU); transmitting, to a second device, the MAC PDU based on the first SL grant and a SL hybrid automatic repeat request (HARQ) process ID; flushing a buffer related to the SL HARQ process ID, based on a number of transmissions of the MAC PDU to the second device being reached the maximum number of transmissions; and receiving, from the base station through a physical downlink control channel (PDCCH), a downlink control information (DCI) related to the SL HARQ process ID, wherein the DCI includes information related to a second SL grant for retransmission of the MAC PDU and information related to a second PUCCH resource. For example, based on the buffer related to the SL HARQ process ID being flushed, the first device may not transmit the MAC PDU to the second device based on the second SL grant, and the first device may not transmit SL HARQ feedback information related to the MAC PDU to the base station based on the second PUCCH resource.

In one embodiment, provided is a first device configured to perform wireless communication. The first device may comprise: one or more memories storing instructions; one or more transceivers; and one or more processors connected to the one or more memories and the one or more transceivers. The one or more processors may execute the instructions to: receive, from a base station, information related to a first sidelink (SL) grant, information related to a first physical uplink control channel (PUCCH) resource, and information related to a maximum number of transmissions of a medium access control (MAC) protocol data unit (PDU); transmit, to a second device, the MAC PDU based on the first SL grant and a SL hybrid automatic repeat request (HARQ) process ID; flush a buffer related to the SL HARQ process ID, based on a number of transmissions of the MAC PDU to the second device being reached the maximum number of transmissions; and receive, from the base station through a physical downlink control channel (PDCCH), a downlink control information (DCI) related to the SL HARQ process ID, wherein the DCI includes information related to a second SL grant for retransmission of the MAC PDU and information related to a second PUCCH resource. For example, based on the buffer related to the SL HARQ process ID being flushed, the first device may not transmit the MAC PDU to the second device based on the second SL grant, and the first device may not transmit SL HARQ feedback information related to the MAC PDU to the base station based on the second PUCCH resource.

Effects of the Disclosure

If the maximum number of transmissions for each SL CG is configured for the UE, ambiguity for the operation of the UE performing SL communication may be eliminated.

BRIEF DESCRIPTION OF THE DRAWINGS

FIG. 11 shows a method in which a UE that has reserved transmission resource(s) informs another UE of the transmission resource(s), based on an embodiment of the present disclosure.

DESCRIPTION OF EXEMPLARY EMBODIMENTS

Figure 1:
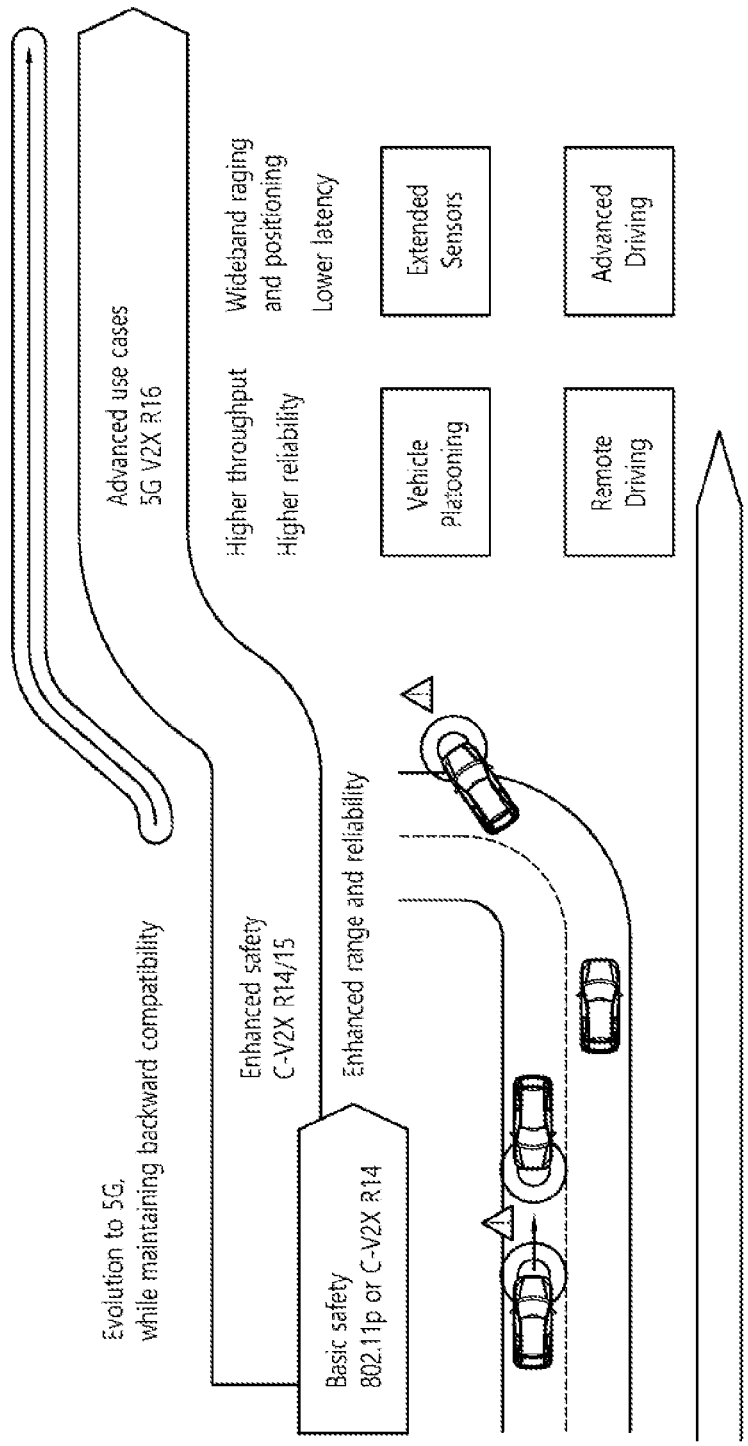
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
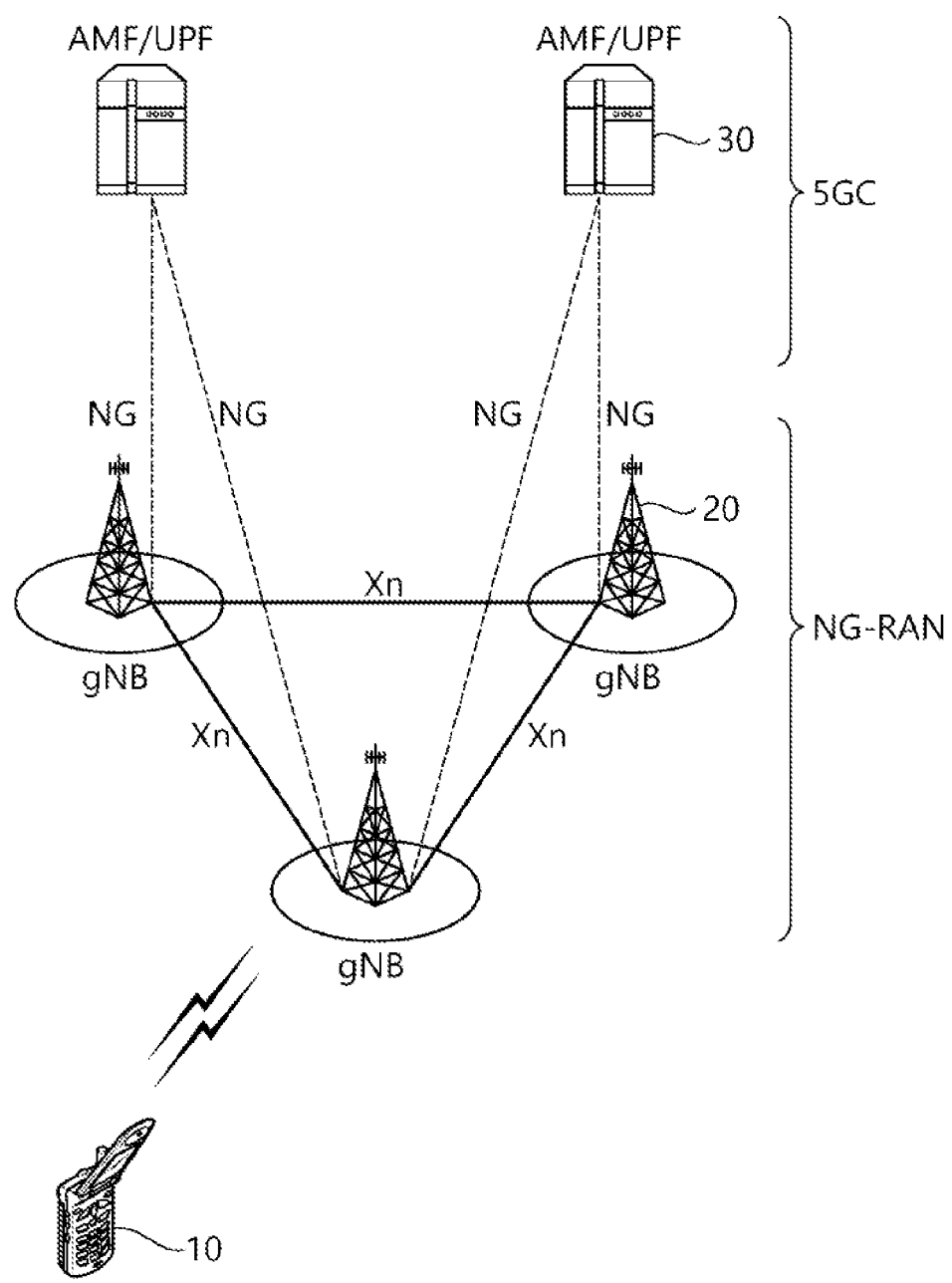
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
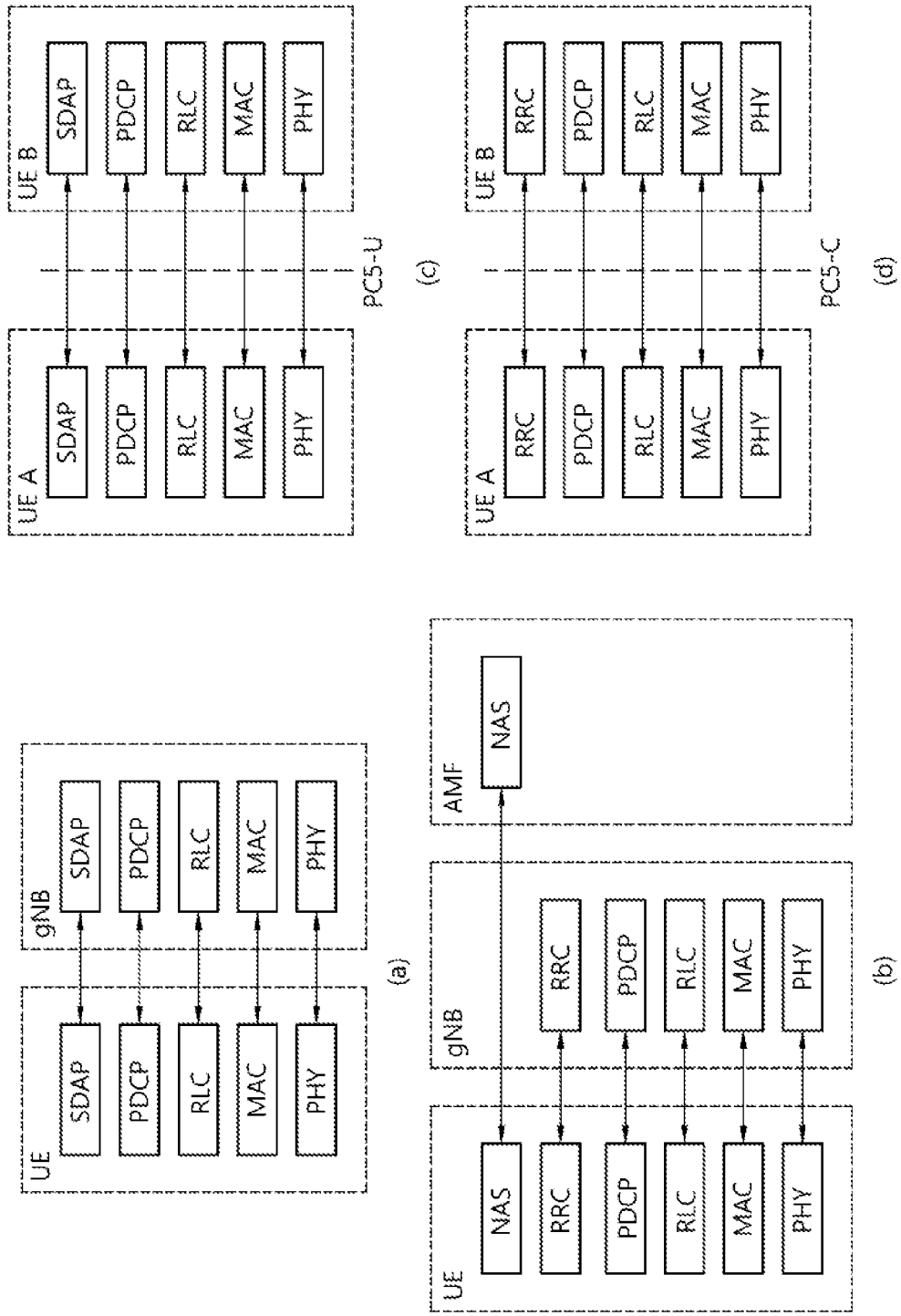
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
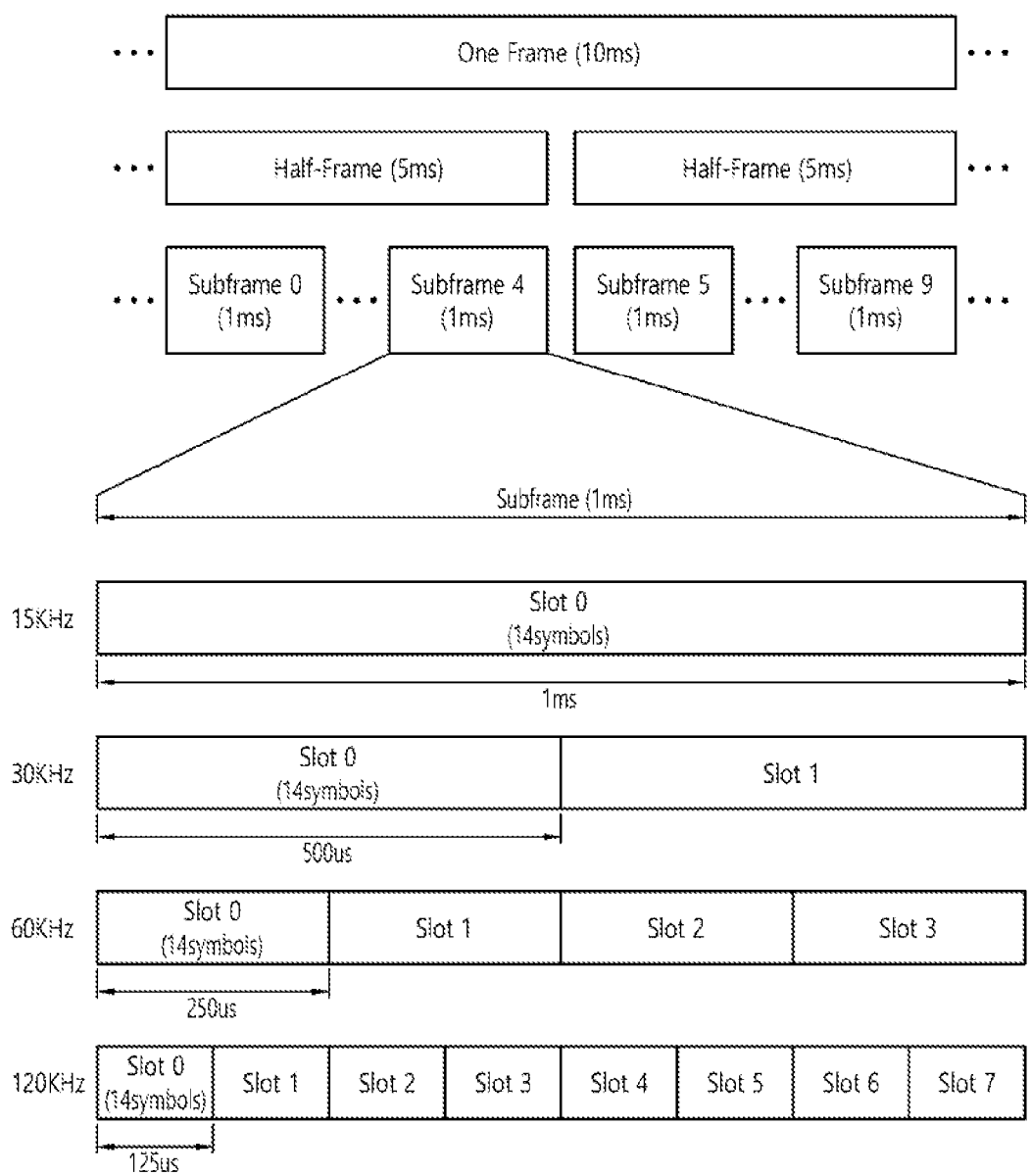
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
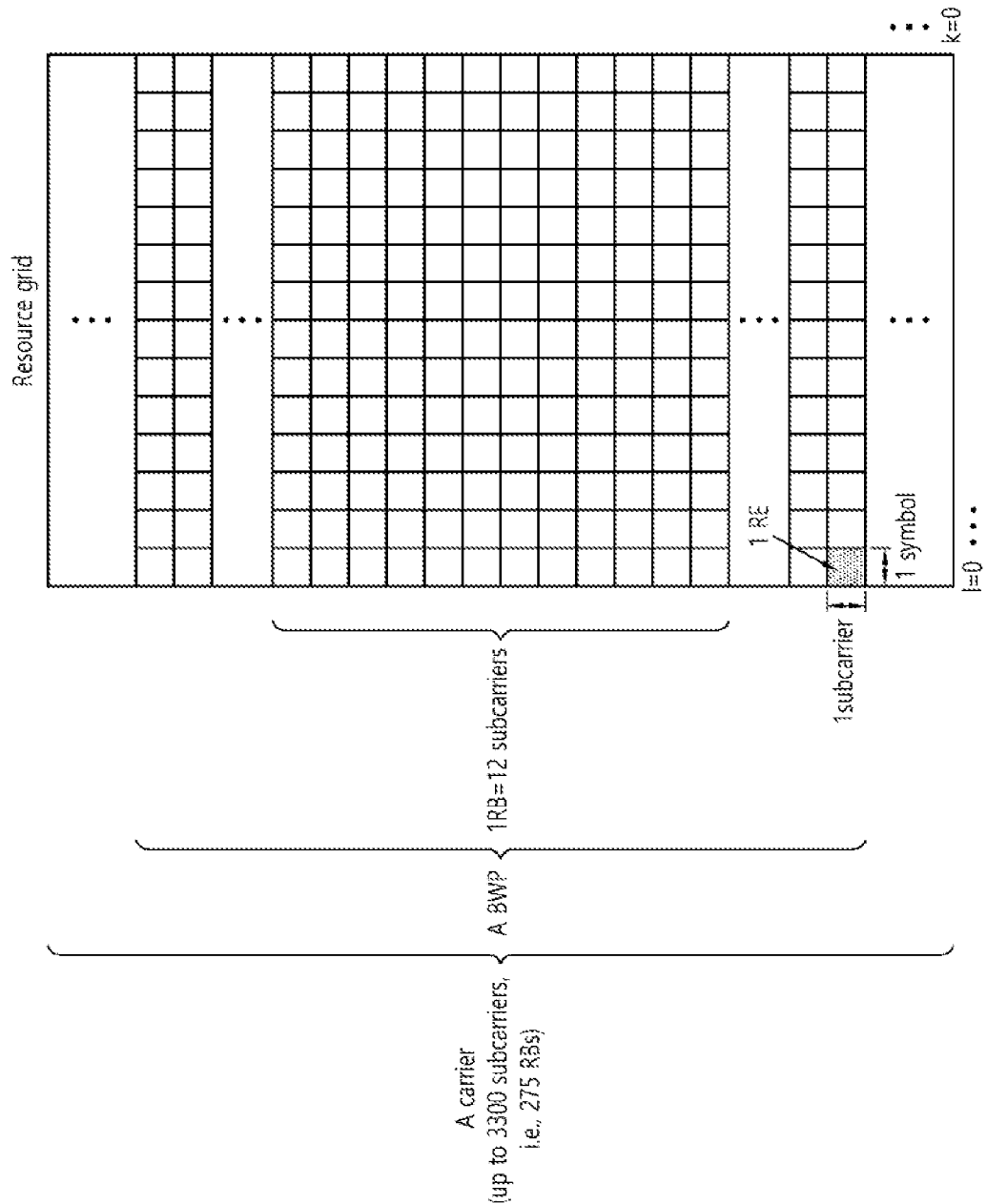
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
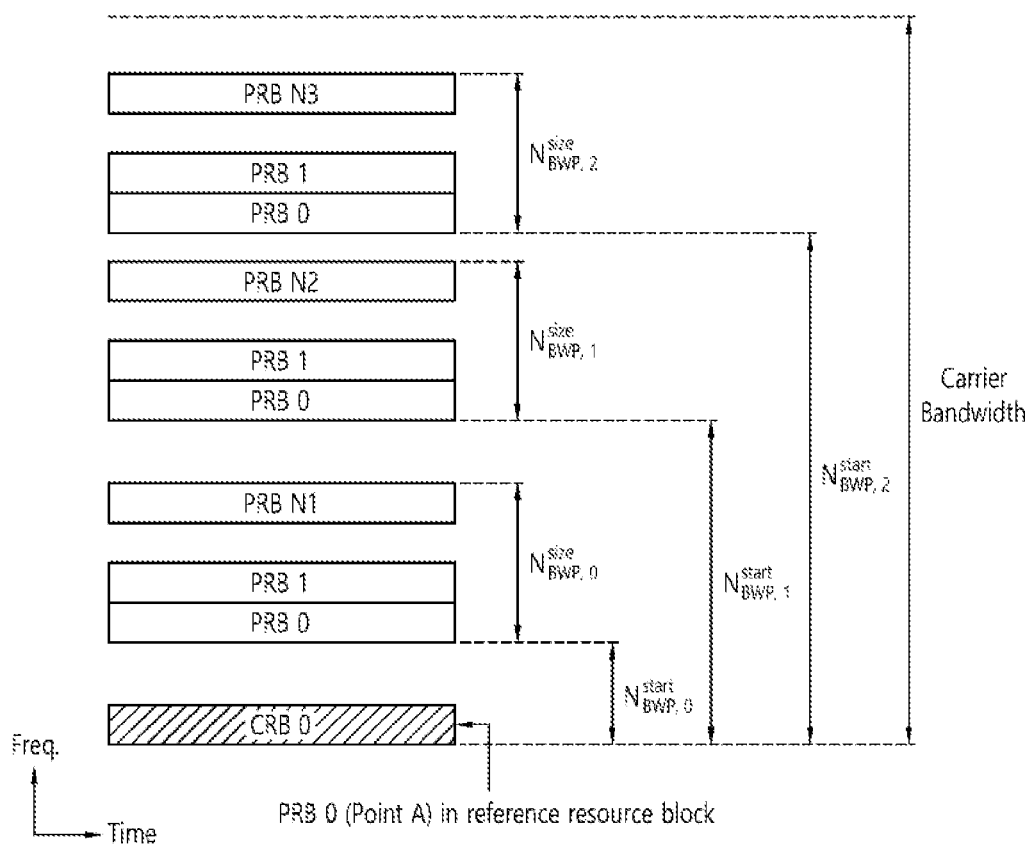
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
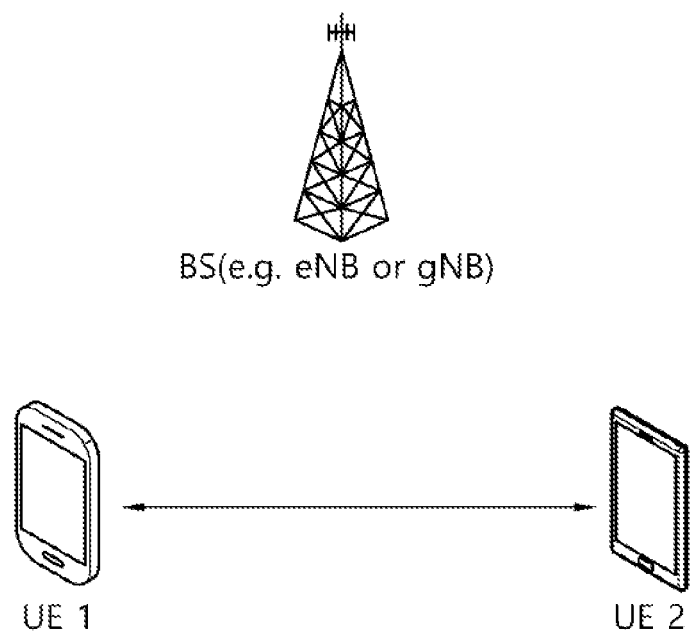
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
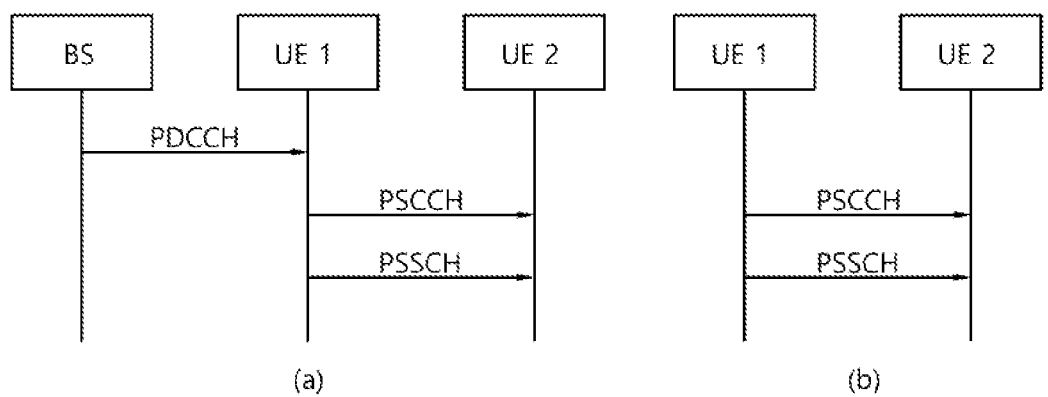
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
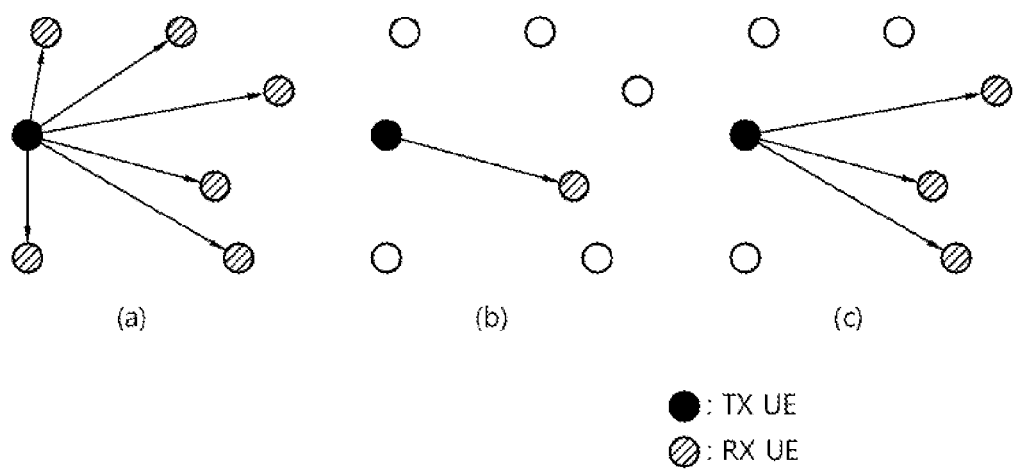
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 10:
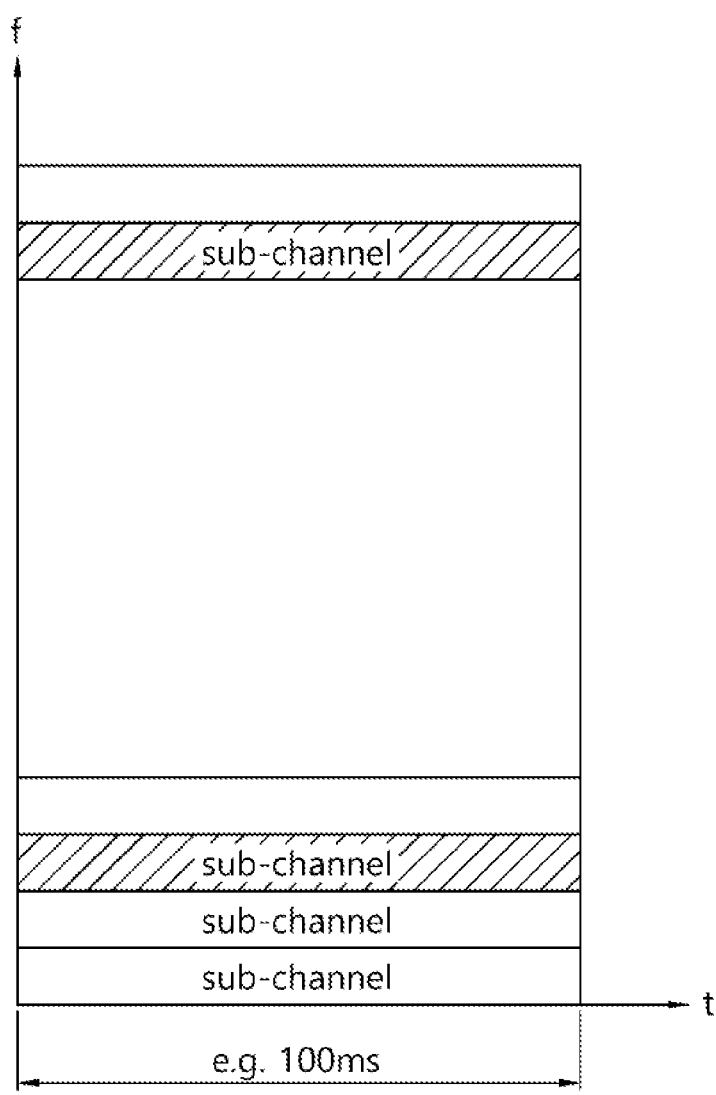
FIG. 10 shows a resource unit for CBR measurement, based on an embodiment of the present disclosure.

FIG. 10 shows a resource unit for CBR measurement, based on an embodiment of the present disclosure. The embodiment of FIG. 10 may be combined with various embodiments of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the UE may report the CBR to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimit$_k$ of a channel occupancy ratio k (CR$_k$) that can be occupied by traffic corresponding to each priority (e.g., k) based on the CBR. For example, the UE may derive the maximum value CRlimit$_k$ of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Hereinafter, a hybrid automatic repeat request (HARQ) procedure will be described.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or reference signal received power (RSRP).

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool.

Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a subchannel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Meanwhile, in the present disclosure, a transmitting UE (i.e., TX UE) may be a UE which transmits data to a (target) receiving UE (i.e., RX UE). For example, the TX UE may be a UE which performs PSCCH transmission and/or PSSCH transmission. For example, the TX UE may be a UE which transmits SL CSI-RS(s) and/or a SL CSI report request indicator to the (target) RX UE. For example, the TX UE may be a UE which transmits (pre-defined) reference signal(s) (e.g., PSSCH demodulation reference signal(s) (DM-RS(s))) and/or a SL (L1) RSRP report request indicator to be used for SL (L1) RSRP measurement to the (target) RX UE(s). For example, the TX UE may be a UE which transmits (control) channel(s) (e.g., PSCCH, PSSCH, etc.) and/or reference signal(s) (e.g., DM-RS(s), CSI-RS(s), etc.) on the (control) channel(s) to be used for a SL radio link monitoring (RLM) operation and/or a SL radio link failure (RLF) operation of the (target) RX UE.

Meanwhile, in the present disclosure, a receiving UE (i.e., RX UE) may be a UE which transmits SL HARQ feedback to a transmitting UE (i.e., TX UE) based on whether decoding of data received from the TX UE is successful and/or whether detection/decoding of a PSCCH (related to PSSCH scheduling) transmitted by the TX UE is successful. For example, the RX UE may be a UE which performs SL CSI transmission to the TX UE based on SL CSI-RS(s) and/or a SL CSI report request indicator received from the TX UE. For example, the RX UE may be a UE which transmits, to the TX UE, a SL (L1) RSRP measurement value measured based on (pre-defined) reference signal(s) and/or a SL (L1) RSRP report request indicator received from the TX UE. For example, the RX UE may be a UE which transmits data of the RX UE to the TX UE. For example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, a TX UE may transmit the entirety or part of information described below to the RX UE through SCI(s). Herein, for example, the TX UE may transmit the entirety or part of the information described below to the RX UE through a first SCI and/or a second SCI.

PSSCH (and/or PSCCH) related resource allocation information (e.g., the location/number of time/frequency resources, resource reservation information (e.g., period))

SL CSI report request indicator or SL (L1) RSRP (and/or SL (L1) RSRQ and/or SL (L1) RSSI) report request indicator SL CSI transmission indicator (or SL (L1) RSRP (and/or SL (L1) RSRQ and/or SL (L1) RSSI) information transmission indicator)) (on a PSSCH)

Modulation and coding scheme (MCS) information

Transmit power information

L1 destination ID information and/or L1 source ID information

SL HARQ process ID information

New data indicator (NDI) information

Redundancy version (RV) information (Transmission traffic/packet related) QoS information (e.g., priority information)

SL CSI-RS transmission indicator or information on the number of antenna ports for (transmitted) SL CSI-RS Location information of the TX UE or location (or distance region) information of the target RX UE (for which SL HARQ feedback is requested)

Reference signal (e.g., DM-RS, etc.) information related to channel estimation and/or decoding of data to be transmitted through a PSSCH. For example, the reference signal information may be information related to a pattern of a (time-frequency) mapping resource of DM-RS, rank information, antenna port index information, information on the number of antenna ports, etc.

Meanwhile, in the present disclosure, for example, a PSCCH may be replaced/substituted with at least one of a SCI, a first SCI ($1^{st}$-stage SCI), and/or a second SCI ($2^{nd}$-stage SCI), or vice versa. For example, a SCI may be replaced/substituted with at least one of a PSCCH, a first SCI, and/or a second SCI, or vice versa. For example, a PSSCH may be replaced/substituted with a second SCI and/or a PSCCH, or vice versa.

Meanwhile, in the present disclosure, for example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the $1^{st}$ SCI and the $2^{nd}$ SCI may be transmitted through different channels. For example, the transmitting UE may transmit the first SCI to the receiving UE through the PSCCH. For example, the second SCI may be transmitted to the receiving UE through an (independent) PSCCH, or may be transmitted in a piggyback manner together with data through the PSSCH.

Meanwhile, in the present disclosure, for example, "configure/configured" or "define/defined" may refer to being (pre-)configured from a base station or a network. For example, "configure/configured" or "define/defined" may refer to being (pre-)configured for each resource pool from the base station or the network. For example, the base station or the network may transmit information related to "configuration" or "definition" to the UE. For example, the base station or the network may transmit information related to "configuration" or "definition" to the UE through pre-defined signaling. For example, the pre-defined signaling may include at least one of RRC signaling, MAC signaling, PHY signaling, and/or SIB.

Meanwhile, in the present disclosure, for example, "configure/configured" or "define/defined" may refer to being designated or configured through pre-configured signaling between UEs. For example, information related to "configuration" or "definition" may be transmitted or received pre-configured signaling between UEs. For example, the pre-defined signaling may include at least one of RRC signaling, MAC signaling, PHY signaling, and/or SIB.

Meanwhile, in the present disclosure, for example, a resource block (RB) may be replaced/substituted with a subcarrier, or vice versa. For example, a packet or a traffic may be replaced/substituted with a transport block (TB) or a medium access control protocol data unit (MAC PDU) according to a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in the present disclosure, a sub-selection window may be replaced/substituted with a selection window and/or a pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant. For example, in the CG type 1, a base station may allocate periodic resource(s) to a TX UE through an RRC message. For example, in the CG type 2, a base station may allocate periodic resource(s) to a TX UE through an RRC message, and the base station may dynamically activate or deactivate the periodic resource(s) through a DCI.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa. For example, the cast or the cast type may include unicast, groupcast and/or broadcast.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), a QoS profile, a QoS parameter, and/or requirement, or vice versa.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in the present disclosure, a high priority may mean a small priority value, and a low priority may mean a large priority value. For example, Table 5 shows an example of priorities.

TABLE 5

| service or logical channel | priority value |
|---|---|
| service A or logical channel A | 1 |
| service B or logical channel B | 2 |
| service C or logical channel C | 3 |

Referring to Table 5, for example, service A or logical channel A related to the smallest priority value may have the highest priority. For example, service C or logical channel C related to the largest priority value may have the lowest priority.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

FIG. 11 shows a method in which a UE that has reserved transmission resource(s) informs another UE of the transmission resource(s), based on an embodiment of the present disclosure. The embodiment of FIG. 11 may be combined with various embodiments of the present disclosure.

Specifically, for example, (a) of FIG. 11 shows a method for performing by a transmitting UE chain-based resource reservation by transmitting/signaling location information of (maximum) 2 transmission resources to receiving UE(s) through one SCI, in the case of a value of K=4. For example, (b) of FIG. 11 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 11, the transmitting UE may transmit/signal only location information of the fourth transmission-related resource to the receiving UE(s) through the fourth (or last) transmission-related PSCCH. For example, referring to (a) of FIG. 11, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 11, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 11, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 11, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 11 shows a method for performing by the transmitting UE block-based resource reservation, by signaling location information of 4 transmission resources to receiving UE(s) through one SCI, in the case of a value of K=4.

Figure 12:
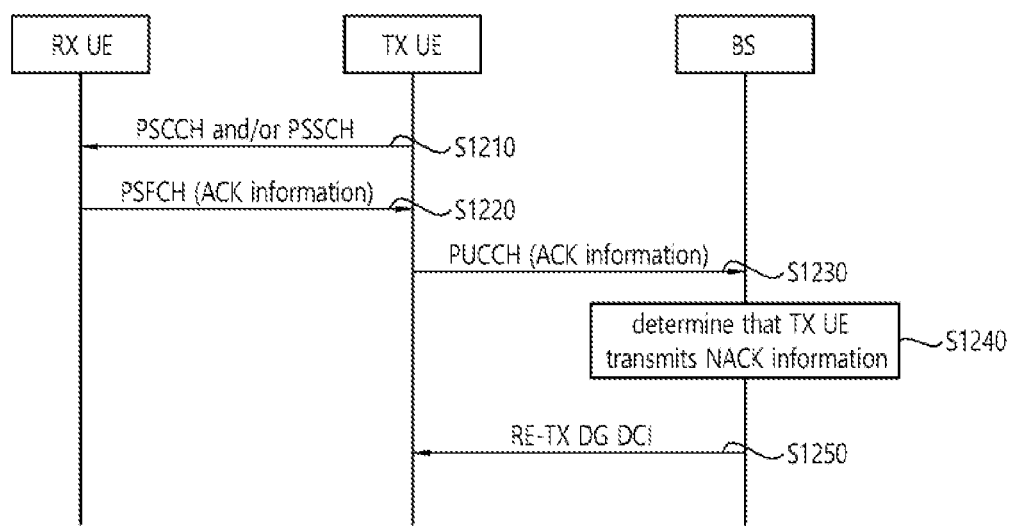
FIG. 12 shows a case in which a base station transmits a DCI related to (re)transmission to a UE due to the base station misidentifies ACK information transmitted by the TX UE as NACK information, based on an embodiment of the present disclosure.

FIG. 12 shows a case in which a base station transmits a DCI related to (re)transmission to a UE due to the base station misidentifies ACK information transmitted by the TX UE as NACK information, based on an embodiment of the present disclosure. The embodiment of FIG. 12 may be combined with various embodiments of the present disclosure.

Referring to FIG. 12, in step S1210, the TX UE may transmit a PSCCH and/or a PSSCH to the RX UE. For example, the TX UE may transmit the PSCCH and/or the PSSCH to the RX UE by using SL resource(s) allocated by the base station. For example, the SL resource(s) may be allocated to the TX UE through a dynamic grant (DG) transmitted by the base station. For example, the SL resource(s) may be allocated to the TX UE through a configured grant (CG) transmitted by the base station.

In step S1220, the TX UE may receive ACK information from the RX UE through a PSFCH. For example, if the RX UE succeeds in receiving/decoding the PSCCH and/or the PSSCH, the RX UE may transmit ACK information to the TX UE through the PSFCH. In step S1230, the TX UE may transmit ACK information to the base station through a PUCCH.

In step S1240, the base station may determine that ACK information transmitted by the TX UE is NACK information. That is, even though the TX UE has transmitted ACK information to the base station, the base station may misidentify ACK information as NACK information. In this case, in step S1250, the base station may allocate additional (re)transmission resource(s) to the TX UE. For example, the base station may transmit a DG related to (re)transmission resource(s) to the TX UE through a DCI in order to allocate (re)transmission resource(s) to the TX UE. For example, the base station may transmit the DCI including the DG related to the (re)transmission resource(s) to the TX UE in order to allocate the (re)transmission resource(s) to the TX UE. For example, the DG related to the (re)transmission resource(s) may indicate (re)transmission resource(s). For convenience of description, the DCI including the DG related to the (re)transmission resource(s) may be referred to as RE-TX DG DCI. For example, the RE-TX DG DCI may include an un-toggled NDI and a HARQ process ID related to ACK information transmitted through the PUCCH.

Additionally, in the embodiment of FIG. 12, it is assumed that the TX UE transmits the PSCCH and/or the PSSCH based on the DG and/or the CG transmitted by the base station.

As described above, if the TX UE receives the RE-TX DG DCI from the base station even though the TX UE has transmitted ACK information to the base station, the TX UE may operate based on at least one option described below.

1) Option 1

For example, the TX UE may not transmit a PSCCH and/or a PSSCH on resource(s) allocated by the RE-TX DG DCI, and the TX UE may transmit ACK information or NACK information to the base station through a PUCCH resource related to the RE-TX DG DCI. For example, the TX UE may not transmit a MAC PDU or dummy information on resource(s) allocated by the RE-TX DG DCI, and the TX UE may transmit ACK information or NACK information to the base station through the PUCCH resource related to the RE-TX DG DCI. For example, the dummy information may be pre-defined information. For example, the MAC PDU may be a MAC PDU previously transmitted by the TX UE to the RX UE. For example, the MAC PDU may be a MAC PDU related to a HARQ process ID related to ACK information transmitted by the TX UE to the base station through the PUCCH in step S1230.

2) Option 2

For example, the TX UE may ignore the RE-TX DG DCI, and the TX UE may not transmit a MAC PDU or dummy information on resource(s) allocated by the RE-TX DG DCI, and the TX UE may not transmit ACK information or NACK information to the base station through a PUCCH resource related to the RE-TX DG DCI. For example, the TX UE may omit/skip transmission of a MAC PDU or dummy information on resource(s) allocated by the RE-TX DG DCI, and the TX UE may omit/skip transmission on the PUCCH resource related to the RE-TX DG DCI. For example, the dummy information may be pre-defined information. For example, the MAC PDU may be a MAC PDU previously transmitted by the TX UE to the RX UE. For example, the MAC PDU may be a MAC PDU related to a HARQ process ID related to ACK information transmitted by the TX UE to the base station through the PUCCH in step S1230.

For example, in the option 1 and/or the option 2, the TX UE may ignore/discard a grant related to the RE-TX DG DCI. For example, in the option 1 and/or the option 2, there may be no new packet (e.g., no MAC PDU) to be transmitted in a buffer of the TX UE. For example, in the option 1 and/or the option 2, there may be no remaining data in a buffer of the TX UE. For example, in the option 1 and/or the option 2, there may be no (new) MAC PDU to be generated/transmitted by the TX UE. For example, in the option 1 and/or the option 2, the TX UE may have flushed the (previous) buffer/data related to the HARQ process indicated by the RE-TX DG DCI.

3) Option 3

For example, the TX UE may transmit a PSCCH and/or a PSSCH on resource(s) allocated by the RE-TX DG DCI, and the TX UE may transmit ACK information or NACK information to the base station through a PUCCH resource related to the RE-TX DG DCI. For example, the TX UE may transmit a MAC PDU or dummy information on resource(s) allocated by the RE-TX DG DCI, and the TX UE may transmit ACK information or NACK information to the base station through the PUCCH resource related to the RE-TX DG DCI. For example, the dummy information may be pre-defined information. For example, the MAC PDU may be a MAC PDU previously transmitted by the TX UE to the RX UE. For example, the MAC PDU may be a MAC PDU related to a HARQ process ID related to ACK information transmitted by the TX UE to the base station through the PUCCH in step S1230.

Hereinafter, in case the TX UE operates based on the option 3, the operation of the TX UE will be described in detail. For example, if the TX UE transmits the PSCCH and/or the PSSCH to the RX UE on the resource(s) allocated by the RE-TX DG DCI, the TX UE may set a HARQ feedback request field included in a SCI related to the PSCCH and/or the PSSCH to "DISABLED". For example, if the TX UE transmits the PSCCH and/or the PSSCH to the RX UE on the resource(s) allocated by the RE-TX DG DCI, the TX UE may set a HARQ feedback request field included in a SCI related to the PSCCH and/or the PSSCH to "ENABLED". For example, if the TX UE transmits the PSCCH and/or the PSSCH to the RX UE on the resource(s) allocated by the RE-TX DG DCI, the TX UE may maintain/set an NDI field value included in a SCI related to the PSCCH and/or the PSSCH to be the same as an (previous) NDI field value related to the HARQ process ID related to ACK information transmitted through the PUCCH. For example, if the TX UE transmits the PSCCH and/or the PSSCH to the RX UE on the resource(s) allocated by the RE-TX DG DCI, the TX UE may set a SL HARQ process ID field value included in a SCI related to the PSCCH and/or the PSSCH to the HARQ process ID related to ACK information transmitted through the PUCCH. For example, if the TX UE transmits the PSCCH and/or the PSSCH to the RX UE on the resource(s) allocated by the RE-TX DG DCI, the TX UE may set a source ID field value and/or a destination ID field value included in a SCI related to the PSCCH and/or the PSSCH to a source ID field value and/or a destination ID field value related to ACK information transmitted through the PUCCH. For example, the source ID may be an L1 source ID, and the destination ID may be an L1 destination ID. For example, if the TX UE transmits the PSCCH and/or the PSSCH to the RX UE on the resource(s) allocated by the RE-TX DG DCI, the TX UE may inform the RX UE that the base station misidentifies ACK through the PUCCH as NACK (i.e., ACK-TO-NACK error occurs), through a pre-configured field included in the SCI related to the PSCCH and/or the PSSCH. In the above case, if the RX UE receives a message and/or a packet (e.g., MAC PDU or dummy information) from the TX UE, the RX UE may discard the message and/or the packet. For example, the RX UE does not attempt to decode the PSSCH, and the RX UE may discard the message and/or the packet. For example, the RX UE may not store the message and/or the packet in a buffer, and the RX UE may discard the message and/or the packet.

For example, the option 1 may be limitedly applied only if a new packet (e.g., MAC PDU) to be transmitted is not in the buffer of the TX UE. For example, the option 1 may be limitedly applied only if the remaining data is not in the buffer of the TX UE. For example, the option 1 may be limitedly applied only if there is no (new) MAC PDU to be generated/transmitted by the TX UE. For example, option 1 may be limitedly applied only if the TX UE flushes the (previous) buffer/data related to the HARQ process indicated by the RE-TX DG DCI.

For example, the option 2 may be limitedly applied only if a new packet (e.g., MAC PDU) to be transmitted is not in the buffer of the TX UE. For example, the option 2 may be limitedly applied only if the remaining data is not in the buffer of the TX UE. For example, the option 2 may be limitedly applied only if there is no (new) MAC PDU to be generated/transmitted by the TX UE. For example, the option 2 may be limitedly applied only if the TX UE flushes the (previous) buffer/data related to the HARQ process indicated by the RE-TX DG DCI.

For example, the option 3 may be limitedly applied only if a new packet (e.g., MAC PDU) to be transmitted is not in the buffer of the TX UE. For example, the option 3 may be limitedly applied only if the remaining data is not in the buffer of the TX UE. For example, the option 3 may be limitedly applied only if there is no (new) MAC PDU to be generated/transmitted by the TX UE. For example, the option 3 may be limitedly applied only if the TX UE flushes the (previous) buffer/data related to the HARQ process indicated by the RE-TX DG DCI.

For example, if the option 1 is applied, and if the TX UE transmits ACK information to the base station through the PUCCH, the TX UE may flush a buffer (of the related HARQ process). For example, if the option 1 is applied, and if the TX UE receives ACK information from the RX UE through the PSFCH, the TX UE may flush a buffer (of the related HARQ process).

For example, if the option 2 is applied, and if the TX UE transmits ACK information to the base station through the PUCCH, the TX UE may flush a buffer (of the related HARQ process). For example, if the option 2 is applied, and if the TX UE receives ACK information from the RX UE through the PSFCH, the TX UE may flush a buffer (of the related HARQ process).

For example, if the option 3 is applied, and if the TX UE transmits ACK information to the base station through the PUCCH, the TX UE may flush a buffer (of the related HARQ process). For example, if the option 3 is applied, and if the TX UE receives ACK information from the RX UE through the PSFCH, the TX UE may flush a buffer (of the related HARQ process).

For example, if the number of (re)transmissions related to a specific TB reaches the maximum allowed number of retransmissions, the TX UE may be configured to report ACK information to the base station through the (associated) PUCCH resource. For example, the maximum allowed number of retransmissions may be pre-configured for the TX UE. For example, if the number of (re)transmissions related to a specific TB reaches the maximum allowed number of retransmissions, the TX UE may transmit ACK information to the base station through the (associated) PUCCH resource. Herein, for example, the TX UE may be a UE performing SL transmission based on the CG transmitted by the base station. Considering the above-described embodiment, the TX UE may transmit ACK information to the base station in the following situations.

First Case: if the number of (re)transmissions reaches the maximum allowed number of retransmissions, the TX UE may report ACK information to the base station through the PUCCH resource (with respect to the specific TB).

Second Case: if the TX UE receives ACK information from the RX UE, the TX UE may report ACK information to the base station through the PUCCH resource (with respect to the specific TB).

For example, the applied option may be configured differently based on the first case and/or the second case. Specifically, for example, in the case of the first case, the TX UE may operate based on the option 2 and/or the option 3.

For example, in the case of the second case, the TX UE may operate based on the option 1 and/or the option 2.

For example, whether the TX UE should transmit the MAC PDU or the dummy information through the resource(s) allocated by the RE-TX DG DCI may be configured or pre-configured by the base station/network to the TX UE. For example, whether the TX UE operating based on the above-described option should transmit the MAC PDU or the dummy information through the resource(s) allocated by the RE-TX DG DCI may be configured or pre-configured by the base station/network to the TX UE. For example, the base station/network may transmit information related to whether the TX UE should transmit the MAC PDU or the dummy information through the resource(s) allocated by the RE-TX DG DCI to the TX UE. For example, if a new packet (e.g., MAC PDU) to be transmitted is not in the buffer of the TX UE, the above rule may be applied (limitedly). For example, if the remaining data is not in the buffer of the TX UE, the above rule may be applied (limitedly). For example, if there is no (new) MAC PDU to be generated/transmitted by the TX UE, the above rule may be (limitedly) applied. For example, if the TX UE flushes the (previous) buffer/data related to the HARQ process indicated by the RE-TX DG DCI, the above rule may be (limitedly) applied. For example, if the TX UE performs SL transmission based on a DG transmitted by the base station, the above rule may be (limitedly) applied. For example, if the TX UE performs SL transmission based on a CG transmitted by the base station, the above rule may be (limitedly) applied.

Figure 13:
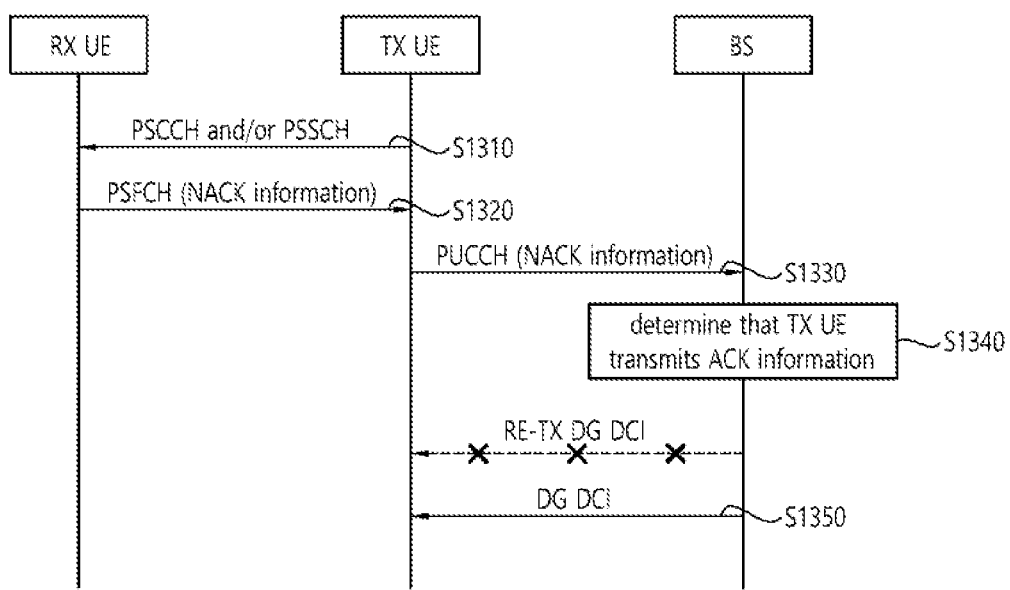
FIG. 13 shows a case in which a base station does not transmit a DCI related to (re)transmission to a UE due to the base station misidentifies NACK information transmitted by the TX UE as ACK information, based on an embodiment of the present disclosure.

FIG. 13 shows a case in which a base station does not transmit a DCI related to (re)transmission to a UE due to the base station misidentifies NACK information transmitted by the TX UE as ACK information, based on an embodiment of the present disclosure. The embodiment of FIG. 13 may be combined with various embodiments of the present disclosure.

Referring to FIG. 13, in step S1310, the TX UE may transmit a PSCCH and/or a PSSCH to the RX UE. For example, the TX UE may transmit the PSCCH and/or the PSSCH to the RX UE by using SL resource(s) allocated by the base station. For example, the SL resource(s) may be allocated to the TX UE through a dynamic grant (DG) transmitted by the base station. For example, the SL resource(s) may be allocated to the TX UE through a configured grant (CG) transmitted by the base station.

In step S1320, the TX UE may receive NACK information from the RX UE through a PSFCH. For example, if the RX UE fails to receive/decode for the PSCCH and/or the PSSCH, the RX UE may transmit NACK information to the TX UE through the PSFCH. Alternatively, for example, if the RX UE fails to receive/decode for the PSCCH and/or the PSSCH, the TX UE may not receive HARQ feedback information from the RX UE through the PSFCH. Alternatively, for example, even though the RX UE has succeeded in receiving/decoding for the PSCCH and/or the PSSCH, the TX UE may not receive HARQ feedback information from the RX UE through the PSFCH, e.g., due to a poor channel environment.

In step S1330, the TX UE may transmit NACK information to the base station through a PUCCH.

In step S1340, the base station may determine that NACK information transmitted by the TX UE is ACK information. That is, even though the TX UE has transmitted NACK information to the base station, the base station may misidentify NACK information as ACK information. In this case, the base station may not allocate additional (re)transmission resource(s) to the TX UE. For example, the base station may not transmit a RE-TX DG DCI to the TX UE.

In step S1350, the base station may allocate transmission resource(s) to the TX UE. For example, the base station may transmit a DG related to the transmission resource(s) to the TX UE through a DCI in order to allocate the transmission resource(s) to the TX UE. For example, the base station may transmit the DCI including the DG related to the transmission resource(s) to the TX UE in order to allocate the transmission resource(s) to the TX UE. For example, the DG related to the transmission resource(s) may indicate transmission resource(s). For convenience of description, the DCI including the DG related to the transmission resource(s) may be referred to as a DG DCI. For example, the DG DCI may include a toggled NDI and a HARQ process ID related to NACK information transmitted through the PUCCH.

Additionally, in the embodiment of FIG. 13, it is assumed that the TX UE transmits the PSCCH and/or the PSSCH based on the DG transmitted by the base station. Alternatively, it is assumed that the TX UE transmits the PSCCH and/or the PSSCH based on the DG and/or the CG transmitted by the base station.

As described above, even though the TX UE has transmitted NACK information to the base station, if the TX UE receives the DG DCI from the base station, the TX UE may operate based on at least one option described below. That is, even though the TX UE has transmitted NACK information to the base station, if the TX UE receives the DG DCI from the base station instead of the RE-TX DG DCI, the TX UE may operate based on at least one option described below.

4) Option 4

For example, the TX UE may transmit a (new) packet on resource(s) allocated by the DG DCI, and the TX UE may transmit (SL) HARQ information determined based on a conventional rule to the base station through a PUCCH resource related to the DG DCI. For example, the TX UE may transmit a new packet on resource(s) allocated by the DG DCI, and the TX UE may transmit HARQ feedback information received from the RX UE to the base station through the PUCCH resource related to the DG DCI.

For example, the option 4 may be limitedly applied only if a new packet (e.g., MAC PDU) to be transmitted is in the buffer of the TX UE. For example, the option 4 may be limitedly applied only if the remaining data is in the buffer of the TX UE. For example, the option 4 may be limitedly applied only if there is a (new) MAC PDU to be generated/transmitted by the TX UE.

5) Option 5

For example, the TX UE may not transmit a PSCCH and/or a PSSCH on resource(s) allocated by the DG DCI, and the TX UE may transmit ACK information or NACK information to the base station through the PUCCH resource related to the DG DCI. For example, the TX UE may not transmit a MAC PDU or dummy information on the resource(s) allocated by the DG DCI, and the TX UE may transmit ACK information or NACK information to the base station through the PUCCH resource related to the DG DCI. For example, the dummy information may be pre-defined information. For example, the MAC PDU may be a MAC PDU previously transmitted by the TX UE to the RX UE. For example, the MAC PDU may be a MAC PDU related to the HARQ process ID related to NACK information transmitted by the TX UE to the base station through the PUCCH in step S1330.

6) Option 6

For example, the TX UE may ignore the DG DCI, and the TX UE may not transmit a MAC PDU or dummy information on resource(s) allocated by the DG DCI, and the TX UE may not transmit ACK information or NACK information to the base station through the PUCCH resource related to the DG DCI. For example, the TX UE may omit/skip transmission of a MAC PDU or dummy information on the resource(s) allocated by the DG DCI, and the TX UE may omit/skip transmission on the PUCCH resource related to the DG DCI. For example, the dummy information may be pre-defined information. For example, the MAC PDU may be a MAC PDU previously transmitted by the TX UE to the RX UE. For example, the MAC PDU may be a MAC PDU related to the HARQ process ID related to NACK information transmitted by the TX UE to the base station through the PUCCH in step S1330.

For example, in the option 5 and/or the option 6, the TX UE may ignore/discard a grant related to the DG DCI. For example, in the option 5 and/or the option 6, there may be no new packet (e.g., MAC PDU) to be transmitted in the buffer of the TX UE. For example, in the option 5 and/or the option 6, there may be no remaining data in the buffer of the TX UE. For example, in the option 5 and/or the option 6, there may be no (new) MAC PDU to be generated/transmitted by the TX UE. For example, in the option 5 and/or the option 6, the TX UE may have flushed the (previous) buffer/data related to the HARQ process indicated by the DG DCI.

For example, if the resource(s) allocated by the DG DCI is not enough for the TX UE to transmit the (previous) buffer/data related to the HARQ process, the option 5 may be applied (limitedly). For example, if the (effective) coding rate value exceeds a pre-configured threshold (e.g., 1), the option 5 may be applied (limitedly). For example, if the TB size of the (previous) buffer/data related to the HARQ process cannot be maintained, the option 5 may be applied (limitedly).

For example, if the resource(s) allocated by the DG DCI is not enough for the TX UE to transmit the (previous) buffer/data related to the HARQ process, the option 6 may be applied (limitedly). For example, if the (effective) coding rate value exceeds a pre-configured threshold (e.g., 1), the option 6 may be applied (limitedly). For example, if the TB size of the (previous) buffer/data related to the HARQ process cannot be maintained, the option 6 may be applied (limitedly).

7) Option 7

For example, the TX UE may transmit a PSCCH and/or a PSSCH on resource(s) allocated by the DG DCI, and the TX UE may (always) transmit ACK information or NACK information to the base station through a PUCCH resource related to the DG DCI. For example, the TX UE may transmit a MAC PDU or dummy information on the resource(s) allocated by the DG DCI, and the TX UE may transmit ACK information or NACK information to the base station through the PUCCH resource related to the DG DCI. For example, the dummy information may be pre-defined information. For example, the MAC PDU may be a MAC PDU previously transmitted by the TX UE to the RX UE. For example, the MAC PDU may be a MAC PDU related to the HARQ process ID related to NACK information transmitted by the TX UE to the base station through the PUCCH in step S1330.

For example, the TX UE may transmit the PSCCH and/or the PSSCH on the resource(s) allocated by the DG DCI, and the TX UE may transmit HARQ feedback information, received from the RX UE in response to the PSCCH and/or the PSSCH, to the base station through the PUCCH resource related to the DG DCI. For example, the TX UE may transmit a MAC PDU or dummy information on the resource(s) allocated by the DG DCI, and the TX UE may transmit HARQ feedback information, received from the RX UE in response to the PSCCH and/or the PSSCH, to the base station through the PUCCH resource related to the DG DCI. For example, the dummy information may be pre-defined information. For example, the MAC PDU may be a MAC PDU previously transmitted by the TX UE to the RX UE. For example, the MAC PDU may be a MAC PDU related to the HARQ process ID related to NACK information transmitted by the TX UE to the base station through the PUCCH in step S1330.

Hereinafter, if the TX UE operates based on the option 7, the operation of the TX UE will be described in detail. For example, if the TX UE transmits the PSCCH and/or the PSSCH to the RX UE on the resource(s) allocated by the DG DCI, the TX UE may set a HARQ feedback request field included in a SCI related to the PSCCH and/or the PSSCH to "DISABLED". For example, if the TX UE transmits the PSCCH and/or the PSSCH to the RX UE on the resource(s) allocated by the DG DCI, the TX UE may set a HARQ feedback request field included in a SCI related to the PSCCH and/or the PSSCH to "ENABLED". For example, if the TX UE transmits the PSCCH and/or the PSSCH to the RX UE on the resource(s) allocated by the DG DCI, the TX UE may maintain/set an NDI field value included in a SCI related to the PSCCH and/or the PSSCH to be the same as an (previous) NDI field value related to the HARQ process ID related to NACK information transmitted through the PUCCH. For example, if the TX UE transmits the PSCCH and/or the PSSCH to the RX UE on the resource(s) allocated by the DG DCI, the TX UE may set a SL HARQ process ID field value included in a SCI related to the PSCCH and/or the PSSCH to the HARQ process ID related to NACK information transmitted through the PUCCH. For example, if the TX UE transmits the PSCCH and/or the PSSCH to the RX UE on the resource(s) allocated by the DG DCI, the TX UE may set a source ID field value and/or a destination ID field value included in a SCI related to the PSCCH and/or the PSSCH to a source ID field value and/or a destination ID field value related to NACK information transmitted through the PUCCH. For example, the source ID may be an L1 source ID, and the destination ID may be an L1 destination ID. For example, if the TX UE transmits the PSCCH and/or the PSSCH to the RX UE on the resource(s) allocated by the DG DCI, the TX UE may inform the RX UE that the base station misidentifies NACK through the PUCCH as ACK (i.e., NACK-TO-ACK error occurs), through a pre-configured field included in the SCI related to the PSCCH and/or the PSSCH. In the above case, if the RX UE receives a message and/or a packet (e.g., MAC PDU or dummy information) from the TX UE, the RX UE may discard the message and/or the packet. For example, the RX UE does not attempt to decode the PSSCH, and the RX UE may discard the message and/or the packet. For example, the RX UE may not store the message and/or the packet in a buffer, and the RX UE may discard the message and/or the packet.

For example, the option 5 may be limitedly applied only if a new packet (e.g., MAC PDU) to be transmitted is not in the buffer of the TX UE. For example, the option 5 may be limitedly applied only if the remaining data is not in the buffer of the TX UE. For example, the option 5 may be limitedly applied only if there is no (new) MAC PDU to be generated/transmitted by the TX UE. For example, the option 5 may be limitedly applied only if the TX UE flushes the (previous) buffer/data related to the HARQ process indicated by the DG DCI.

For example, the option 6 may be limitedly applied only if a new packet (e.g., MAC PDU) to be transmitted is not in the buffer of the TX UE. For example, the option 6 may be limitedly applied only if the remaining data is not in the buffer of the TX UE. For example, the option 6 may be limitedly applied only if there is no (new) MAC PDU to be generated/transmitted by the TX UE. For example, the option 6 may be limitedly applied only if the TX UE flushes the (previous) buffer/data related to the HARQ process indicated by the DG DCI.

For example, the option 7 may be limitedly applied only if a new packet (e.g., MAC PDU) to be transmitted is not in the buffer of the TX UE. For example, the option 7 may be limitedly applied only if the remaining data is not in the buffer of the TX UE. For example, the option 7 may be limitedly applied only if there is no (new) MAC PDU to be generated/transmitted by the TX UE. For example, the option 7 may be limitedly applied only if the TX UE flushes the (previous) buffer/data related to the HARQ process indicated by the DG DCI.

For example, if the option 4 is applied, the TX UE may flush the buffer (of the related HARQ process) if an NDI field value included in the (received) DG DCI indicating the same HARQ process is toggled even though the TX UE transmits NACK information to the base station through the PUCCH.

For example, if the option 5 is applied, the TX UE may flush the buffer (of the related HARQ process) if an NDI field value included in the (received) DG DCI indicating the same HARQ process is toggled even though the TX UE transmits NACK information to the base station through the PUCCH.

For example, if the option 6 is applied, the TX UE may flush the buffer (of the related HARQ process) if an NDI field value included in the (received) DG DCI indicating the same HARQ process is toggled even though the TX UE transmits NACK information to the base station through the PUCCH.

For example, if the option 7 is applied, the TX UE may flush the buffer (of the related HARQ process) if an NDI field value included in the (received) DG DCI indicating the same HARQ process is toggled even though the TX UE transmits NACK information to the base station through the PUCCH.

For example, whether the TX UE should transmit the MAC PDU or the dummy information through the resource(s) allocated by the DG DCI may be configured or pre-configured by the base station/network to the TX UE. For example, whether the TX UE operating based on the above-described option should transmit the MAC PDU or the dummy information through the resource(s) allocated by the DG DCI may be configured or pre-configured by the base station/network to the TX UE. For example, the base station/network may transmit information related to whether the TX UE should transmit the MAC PDU or the dummy information through the resource(s) allocated by the DG DCI to the TX UE. For example, if a new packet (e.g., MAC PDU) to be transmitted is not in the buffer of the TX UE, the above rule may be applied (limitedly). For example, if the remaining data is not in the buffer of the TX UE, the above rule may be applied (limitedly). For example, if there is no (new) MAC PDU to be generated/transmitted by the TX UE, the above rule may be (limitedly) applied. For example, if the TX UE flushes the (previous) buffer/data related to the HARQ process indicated by the DG DCI, the above rule may be applied (limitedly). For example, if the TX UE performs SL transmission based on the DG transmitted by the base station, the above rule may be (limitedly) applied. For example, if the TX UE performs SL transmission based on the CG transmitted by the base station, the above rule may be (limitedly) applied.

Based on an embodiment of the present disclosure, options applied to the TX UE and/or the RX UE may be configured differently based on whether the TX UE receives ACK information from the RX UE. For example, options applied to the TX UE and/or the RX UE may be configured differently based on whether the TX UE transmits a HARQ ENABLED MAC PDU to the RX UE. For example, the HARQ ENABLED MAC PDU may be a MAC PDU requiring HARQ feedback. For example, options applied to the TX UE and/or the RX UE may be configured differently based on whether the HARQ feedback request field included in the SCI transmitted by the TX UE indicates HARQ feedback enabled. For example, options applied to the TX UE and/or the RX UE may be configured differently based on a cast type. For example, the cast type may include at least one of broadcast, groupcast, and/or unicast. For example, options applied to the TX UE and/or the RX UE may be configured differently based on whether the TX UE flushes the buffer (of the related HARQ process) after receiving ACK information from the RX UE through the PSFCH. For example, options applied to the TX UE and/or the RX UE may be configured differently based on whether the TX UE flushes the buffer (of the related HARQ process) after transmitting ACK information to the base station through the PUCCH. For example, options applied to the TX UE and/or the RX UE may be configured differently based on whether the TX UE flushes the buffer related to the HARQ process indicated by the DG DCI. For example, options applied to the TX UE and/or the RX UE may be configured differently based on whether the TX UE flushes the buffer related to the HARQ process indicated by the RE-TX DG DCI. For example, options applied to the TX UE and/or the RX UE may be configured differently based on a MODE 1 type (e.g., DG or CG). For example, options applied to the TX UE and/or the RX UE may be configured differently based on a type of a service. For example, options applied to the TX UE and/or the RX UE may be configured differently based on a priority of a service. For example, options applied to the TX UE and/or the RX UE may be configured differently based on a congestion level (e.g., CBR) (of a resource pool).

For example, in the embodiment of FIG. 12, if the TX UE receives ACK information (for the transmitted MAC PDU) from the RX UE through the PSFCH, the TX UE may be configured to flush its buffer (of the related HARQ process), and the TX UE may be configured to ignore additional SL grant indicating the same HARQ process ID and an un-toggled NDI received later. For example, in the embodiment of FIG. 12, if the TX UE transmits a HARQ ENABLED MAC PDU, the TX UE may be configured to flush its buffer (of the related HARQ process), and the TX UE may be configured to ignore additional SL grant indicating the same HARQ process ID and an un-toggled NDI received later. For example, in the embodiment of FIG. 12, if the TX UE sets a HARQ feedback request field included in a SCI to "ENABLED" when transmitting a MAC PDU, the TX UE may be configured to flush its buffer (of the related HARQ process), and the TX UE may be configured to ignore additional SL grant indicating the same HARQ process ID and an un-toggled NDI received later. In the above-mentioned case, the TX UE flushes its buffer (of the related HARQ process), and the TX UE may ignore the additional SL grant indicating the same HARQ process ID and the un-toggled NDI received later. In the above case, the option 2 and/or the option 1 may be applied.

For example, in the embodiment of FIG. 12, if the TX UE transmits a HARQ DISABLED MAC PDU to the RX UE, the TX UE may operate based on the option 3. For example, in the embodiment of FIG. 12, if the TX UE sets a HARQ feedback request field included in a SCI to "DISABLED" when transmitting a MAC PDU, the TX UE may operate based on the option 3. For example, in the embodiment of FIG. 12, if the TX UE does not flush the buffer (of the related HARQ process) after transmitting ACK information to the base station through the PUCCH, the TX UE may operate based on the option 3. For example, in the embodiment of FIG. 12, if the TX UE transmits a MAC PDU related to broadcast, the TX UE may operate based on the option 3.

For example, in the embodiment of FIG. 12, if the TX UE is configured to flush the buffer (of the related HARQ process) after transmitting ACK information to the base station through the PUCCH, the TX UE may operate based on the option 2 and/or the option 1. For example, in the embodiment of FIG. 12, if the TX UE transmits a HARQ DISABLED MAC PDU to the RX UE, and if the TX UE is configured to flush the buffer (of the related HARQ process) after transmitting ACK information to the base station through the PUCCH, the TX UE may operate based on the option 2 and/or the option 1. For example, in the embodiment of FIG. 12, if the TX UE sets a HARQ feedback request field included in a SCI to "DISABLED" when transmitting a MAC PDU, and if the TX UE is configured to flush the buffer (of the related HARQ process) after transmitting ACK information to the base station through the PUCCH, the TX UE may operate based on the option 2 and/or the option 1. For example, in the embodiment of FIG. 12, if the TX UE transmits a MAC PDU related to broadcast, and if the TX UE is configured to flush the buffer (of the related HARQ process) after transmitting ACK information to the base station through the PUCCH, the TX UE may operate based on the option 2 and/or the option 1.

For example, in the embodiment of FIG. 12, if the TX UE has (already) flushed the buffer related to the HARQ process ID indicated by the RE-TX DG DCI, the TX UE may operate based on the option 2 and/or the option 1. For example, in the embodiment of FIG. 12, if the TX UE has not (yet) flushed the buffer related to the HARQ process ID indicated by the RE-TX DG DCI, the TX UE may operate based on the option 3 and/or the option 1. For example, if the number of (re)transmissions related to the specific TB reaches the (pre-configured) maximum allowed number of retransmissions, the TX UE may not flush the buffer related to the HARQ process ID indicated by the RE-TX DG DCI. For example, if the number of (re)transmissions related to the specific TB reaches the (pre-configured) maximum allowed number of retransmissions, the TX UE may flush the buffer related to the HARQ process ID indicated by the RE-TX DG DCI.

For example, in the embodiment of FIG. 13, if a priority of a service transmitted by the TX UE is higher than a pre-configured threshold, the TX UE may be configured to operate based on one of the option 4, the option 5 and/or the option 7. For example, in the embodiment of FIG. 13, if a congestion level (of a resource pool) is lower than a pre-configured threshold, the TX UE may be configured to operate based on one of the option 4, the option 5 and/or the option 7. Otherwise, the TX UE may be configured to operate based on the option 6.

For example, in the embodiment of FIG. 13, if a priority of a service transmitted by the TX UE is lower than a pre-configured threshold, the TX UE may be configured to operate based on the option 6. For example, in the embodiment of FIG. 13, if a congestion level (of a resource pool) is higher than a pre-configured threshold, the TX UE may be configured to operate based on the option 6.

Based on an embodiment of the present disclosure, if the UE transmits ACK information to the base station through the pre-configured PUCCH, the UE may be configured to flush the buffer (of the related HARQ process). For example, if the NDI field value included in the (received) DG DCI indicating the same HARQ process is toggled even though the UE transmits NACK information to the base station through the PUCCH, the UE may be configured to flush the buffer (of the related HARQ process). For example, if the NDI field value included in the (received) DG DCI indicating the same HARQ process is not toggled even though the UE transmits ACK information to the base station through the PUCCH, the UE may be configured to flush the buffer (of the related HARQ process). For example, if the TX UE receives ACK information from the RX UE through the PSFCH, the TX UE may be configured to flush the buffer (of the related HARQ process). For example, if the number of (re)transmissions (related to the specific TB) reaches the pre-configured maximum allowed number of (re)transmissions, the UE may be configured to flush the buffer (of the related HARQ process). For example, the UE may be a TX UE. In the case described above, the UE may flush the buffer (of the related HARQ process). Herein, for example, if the UE performs SL communication based on the DG transmitted by the base station, the above rule may be (limitedly) applied. For example, if the UE performs SL communication based on the CG transmitted by the base station, the above rule may be (limitedly) applied.

Based on an embodiment of the present disclosure, the option(s) applied to the UE may be configured or pre-configured to the UE from the base station/network. For example, the base station/network may transmit, to the UE, information related to the option(s) applied to the UE. For example, the option(s) applied to the UE may include at least one of option(s) applied to the UE for each MODE 1 operation type (e.g., DG or CG), option(s) applied to the UE for each CG-related RE-TX DG, and/or option(s) applied to the UE for each DG-related RE-TX DG.

Figure 14:
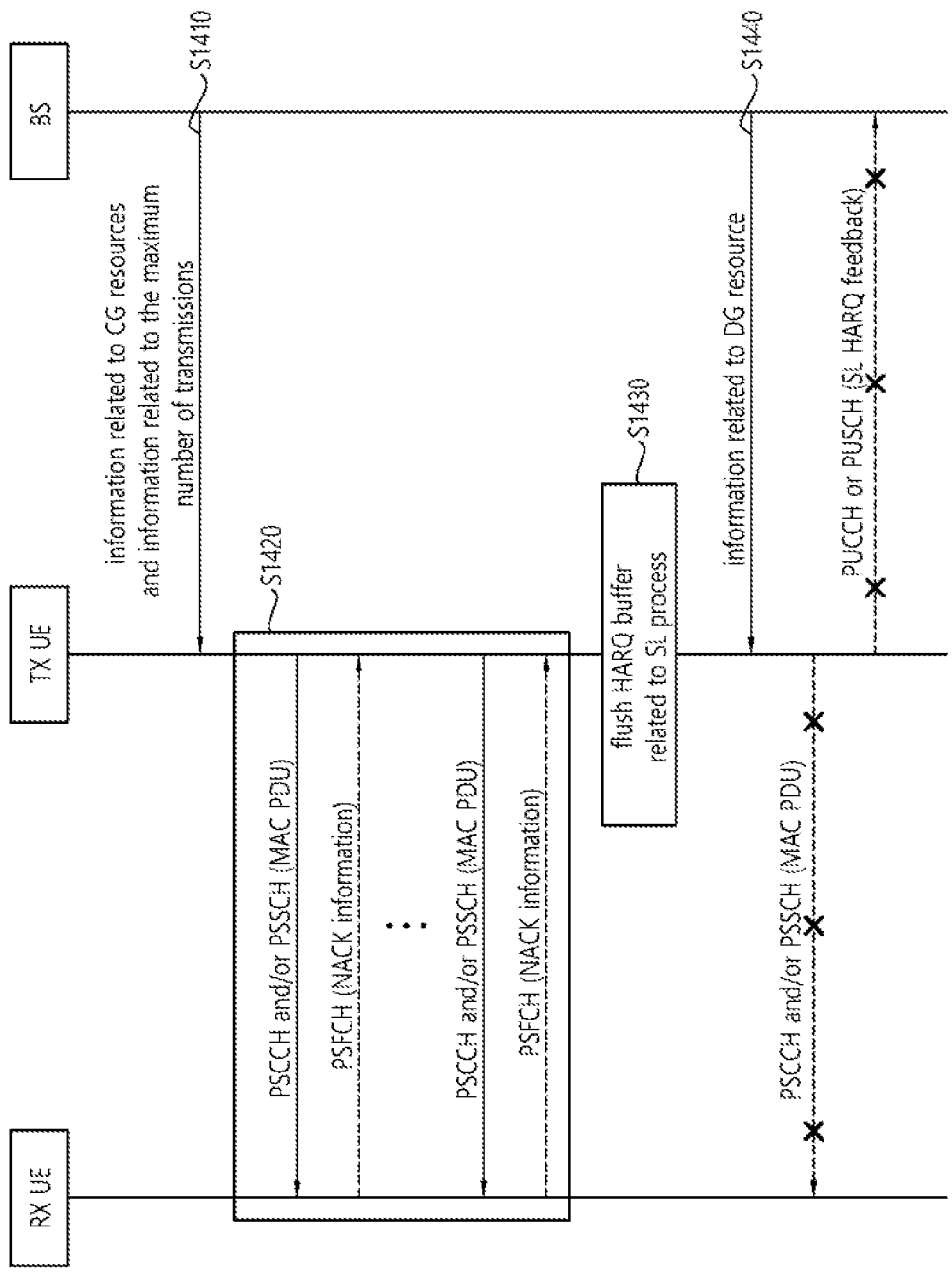
FIG. 14 shows an operation of a UE when the UE that has flushed a buffer related to a HARQ process receives information on retransmission resource(s) related to the HARQ process, based on an embodiment of the present disclosure.

FIG. 14 shows an operation of a UE when the UE that has flushed a buffer related to a HARQ process receives information on retransmission resource(s) related to the HARQ process, based on an embodiment of the present disclosure. The embodiment of FIG. 14 may be combined with various embodiments of the present disclosure.

Referring to FIG. 14, in step S1410, the TX UE may receive information related to CG resources and information related to the maximum number of transmissions from the base station. For example, the TX UE may receive information related to CG resources and information related to the maximum number of transmissions from the base station through RRC signaling. For example, the TX UE may receive information related to the maximum number of transmissions from the base station through RRC signaling, and the TX UE may receive information related to CG resources from the base station through a PDCCH (e.g., DCI). For example, the CG resources may be resources periodically allocated to the TX UE for SL transmission.

In step S1420, the TX UE may transmit, to the RX UE, the same MAC PDU by the maximum number of transmissions based on HARQ retransmission. Herein, the HARQ retransmission may refer to a retransmission scheme in which the TX UE performs retransmission based on SL HARQ feedback from the RX UE. Alternatively, for example, the TX UE may transmit, to the RX UE, the same MAC PDU by the maximum number of transmissions based on blind retransmission. Herein, the blind retransmission may refer to a retransmission scheme in which the TX UE performs retransmission without SL HARQ feedback from the RX UE.

In step S1430, the TX UE may flush a HARQ buffer related to a SL process. For example, if the number of transmissions of the MAC PDU reaches the maximum number of retransmissions, the TX UE may flush the HARQ buffer related to the SL process. For example, if the number of transmissions of the MAC PDU transmitted based on a first SL process ID reaches the maximum number of retransmissions, the TX UE may flush the HARQ buffer related to the SL process (i.e., the SL process related to the first SL process ID). In the present disclosure, the SL process may be referred to as a SL HARQ process.

In step S1440, the TX UE may receive information related to DG resource(s) from the base station. For example, the DG resource(s) may include resource(s) for SL retransmission (i.e., retransmission of the MAC PDU) and a PUCCH resource. For example, the TX UE may receive information related to the DG resource(s) from the base station through a DCI.

In the above case, if the buffer related to the SL process is flushed, the TX UE may not retransmit the MAC PDU to the RX UE based on the DG resource(s), and the TX UE may not transmit SL HARQ feedback information related to the MAC PDU to the base station based on the PUCCH resource. That is, if the SL HARQ process ID corresponding to the SL grant received by the TX UE through the PDCCH is related to the SL process of the empty HARQ buffer, the TX UE may ignore the SL grant (e.g., DG resource(s)). Therefore, the TX UE may not retransmit the MAC PDU to the RX UE based on the SL grant, and the TX UE may not transmit SL HARQ feedback information related to the MAC PDU to the base station based on the PUCCH resource.

Figure 15:
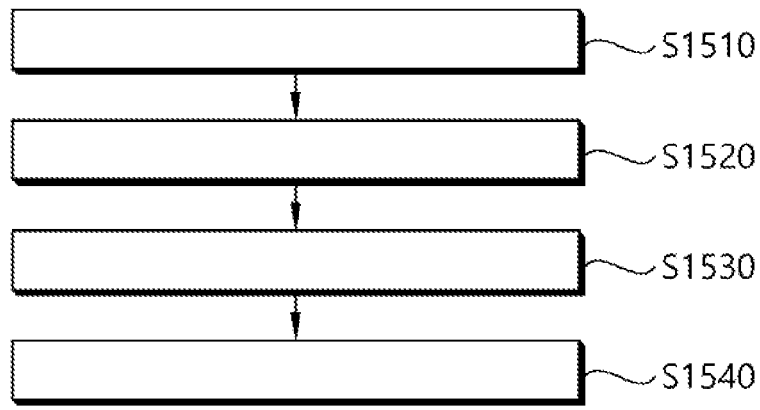
FIG. 15 shows a method for a first device to perform wireless communication, based on an embodiment of the present disclosure.

FIG. 15 shows a method for a first device to perform wireless communication, based on an embodiment of the present disclosure. The embodiment of FIG. 15 may be combined with various embodiments of the present disclosure.

Referring to FIG. 15, in step S1510, the first device may receive, from a base station, information related to a first sidelink (SL) grant, information related to a first physical uplink control channel (PUCCH) resource, and information related to a maximum number of transmissions of a medium access control (MAC) protocol data unit (PDU). In step S1520, the first device may transmit, to a second device, the MAC PDU based on the first SL grant and a SL hybrid automatic repeat request (HARQ) process ID. In step S1530, the first device may flush a buffer related to the SL HARQ process ID, based on a number of transmissions of the MAC PDU to the second device being reached the maximum number of transmissions. In step S1540, the first device may receive, from the base station through a physical downlink control channel (PDCCH), a downlink control information (DCI) related to the SL HARQ process ID. For example, the DCI may include information related to a second SL grant for retransmission of the MAC PDU and information related to a second PUCCH resource. For example, based on the buffer related to the SL HARQ process ID being flushed, the first device may not transmit the MAC PDU to the second device based on the second SL grant, and the first device may not transmit SL HARQ feedback information related to the MAC PDU to the base station based on the second PUCCH resource.

For example, the SL HARQ process ID may be related to the MAC PDU, and the SL HARQ process ID may be transmitted to the second device based on a sidelink control information (SCI) transmitted through a physical sidelink shared channel (PSSCH). For example, based on the buffer related to the SL HARQ process ID being flushed, the first device may ignore the second SL grant. For example, the first SL grant may be a SL configured grant (CG), and the SL CG may be one of a first type SL CG or a second type SL CG.

Additionally, for example, the first device may transmit, to the base station, NACK information related to the MAC PDU based on the first PUCCH resource related to the first SL grant. For example, the DCI may be received from the base station based on the NACK information. For example, if the first device receives NACK information from the second device through a PSFCH, the first device may transmit NACK information related to the MAC PDU to the base station based on the first PUCCH resource related to the first SL grant. For example, if the first device fails to receive HARQ feedback from the second device through a PSFCH, the first device may transmit NACK information related to the MAC PDU to the base station based on the first PUCCH resource related to the first SL grant. Specifically, for example, if the second device fails to decode a PSCCH transmitted by the first device, the second device may not transmit HARQ feedback to the first device, and the first device may fail to receive HARQ feedback from the second device through the PSFCH. For example, even though the second device has transmitted HARQ feedback to the first device, the first device may fail to receive HARQ feedback from the second device through a PSFCH. For example, if a channel state is not good, the first device may fail to receive HARQ feedback from the second device through the PSFCH even though the second device has transmitted HARQ feedback to the first device. For example, if the first device fails to perform an operation for PSFCH reception or PSFCH monitoring related to the MAC PDU transmitted by the first device due to a prioritization operation, the first device may fail to receive HARQ feedback from the second device through the PSFCH. For example, the prioritization operation may include a prioritization operation between SL communication and UL communication, a prioritization operation between LTE SL communication and NR SL communication, a prioritization operation between PSFCH transmissions, a priority operation between PSFCH transmission and PSFCH reception, etc.

Additionally, for example, the first device may transmit, to the base station, ACK information related to the MAC PDU based on the number of transmissions of the MAC PDU to the second device being reached the maximum number of transmissions.

For example, based on the first device which receives ACK information related to the MAC PDU from the second device through a physical sidelink feedback channel (PSFCH), the buffer related to the SL HARQ process ID may be flushed.

For example, based on the first device which transmits ACK information related to the MAC PDU to the base station, the buffer related to the SL HARQ process ID may be flushed.

For example, based on the first device which sets a field related to HARQ feedback in a SCI related to the MAC PDU that reaches the maximum number of transmissions to enable, the buffer related to the SL HARQ process ID may be flushed.

For example, based on (i) the first device which transmits NACK information related to the MAC PDU to the base station and (ii) the DCI related to the SL HARQ process ID including a toggled new data indicator (NDI), the buffer related to the SL HARQ process ID may be flushed.

For example, based on (i) the first device which transmits ACK information related to the MAC PDU to the base station and (ii) the DCI related to the SL HARQ process ID including an un-toggled new data indicator (NDI), the buffer related to the SL HARQ process ID may be flushed.

For example, the maximum number of transmissions may be determined based on at least one priority of at least one logical channel related to the MAC PDU. For example, the maximum number of transmissions may be related to a highest priority among the at least one priority of the at least one logical channel.

The proposed method may be applied to the device(s) based on various embodiments of the present disclosure. First, the processor 102 of the first device 100 may control the transceiver 106 to receive, from a base station, information related to a first sidelink (SL) grant, information related to a first physical uplink control channel (PUCCH) resource, and information related to a maximum number of transmissions of a medium access control (MAC) protocol data unit (PDU). In addition, the processor 102 of the first device 100 may control the transceiver 106 to transmit, to a second device, the MAC PDU based on the first SL grant and a SL hybrid automatic repeat request (HARQ) process ID. In addition, the processor 102 of the first device 100 may flush a buffer related to the SL HARQ process ID, based on a number of transmissions of the MAC PDU to the second device being reached the maximum number of transmissions. In addition, the processor 102 of the first device 100 may control the transceiver 106 to receive, from the base station through a physical downlink control channel (PDCCH), a downlink control information (DCI) related to the SL HARQ process ID. For example, the DCI may include information related to a second SL grant for retransmission of the MAC PDU and information related to a second PUCCH resource. For example, based on the buffer related to the SL HARQ process ID being flushed, the first device may not transmit the MAC PDU to the second device based on the second SL grant, and the first device may not transmit SL HARQ feedback information related to the MAC PDU to the base station based on the second PUCCH resource.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, information related to a first sidelink (SL) grant, information related to a first physical uplink control channel (PUCCH) resource, and information related to a maximum number of transmissions of a medium access control (MAC) protocol data unit (PDU); transmit, to a second device, the MAC PDU based on the first SL grant and a SL hybrid automatic repeat request (HARQ) process ID; flush a buffer related to the SL HARQ process ID, based on a number of transmissions of the MAC PDU to the second device being reached the maximum number of transmissions; and receive, from the base station through a physical downlink control channel (PDCCH), a downlink control information (DCI) related to the SL HARQ process ID. For example, the DCI may include information related to a second SL grant for retransmission of the MAC PDU and information related to a second PUCCH resource. For example, based on the buffer related to the SL HARQ process ID being flushed, the first device may not transmit the MAC PDU to the second device based on the second SL grant, and the first device may not transmit SL HARQ feedback information related to the MAC PDU to the base station based on the second PUCCH resource.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive, from a base station, information related to a first sidelink (SL) grant, information related to a first physical uplink control channel (PUCCH) resource, and information related to a maximum number of transmissions of a medium access control (MAC) protocol data unit (PDU); transmit, to a second UE, the MAC PDU based on the first SL grant and a SL hybrid automatic repeat request (HARQ) process ID; flush a buffer related to the SL HARQ process ID, based on a number of transmissions of the MAC PDU to the second UE being reached the maximum number of transmissions; and receive, from the base station through a physical downlink control channel (PDCCH), a downlink control information (DCI) related to the SL HARQ process ID. For example, the DCI may include information related to a second SL grant for retransmission of the MAC PDU and information related to a second PUCCH resource. For example, based on the buffer related to the SL HARQ process ID being flushed, the first UE may not transmit the MAC PDU to the second UE based on the second SL grant, and the first UE may not transmit SL HARQ feedback information related to the MAC PDU to the base station based on the second PUCCH resource.

Based on an embodiment of the present disclosure, a non-transitory computer-readable storage medium storing instructions may be provided. For example, the non-transitory computer-readable storage medium storing instructions, when executed, may cause a first device to: receive, from a base station, information related to a first sidelink (SL) grant, information related to a first physical uplink control channel (PUCCH) resource, and information related to a maximum number of transmissions of a medium access control (MAC) protocol data unit (PDU); transmit, to a second device, the MAC PDU based on the first SL grant and a SL hybrid automatic repeat request (HARQ) process ID; flush a buffer related to the SL HARQ process ID, based on a number of transmissions of the MAC PDU to the second device being reached the maximum number of transmissions; and receive, from the base station through a physical downlink control channel (PDCCH), a downlink control information (DCI) related to the SL HARQ process ID. For example, the DCI may include information related to a second SL grant for retransmission of the MAC PDU and information related to a second PUCCH resource. For example, based on the buffer related to the SL HARQ process ID being flushed, the first device may not transmit the MAC PDU to the second device based on the second SL grant, and the first device may not transmit SL HARQ feedback information related to the MAC PDU to the base station based on the second PUCCH resource.

Figure 16:
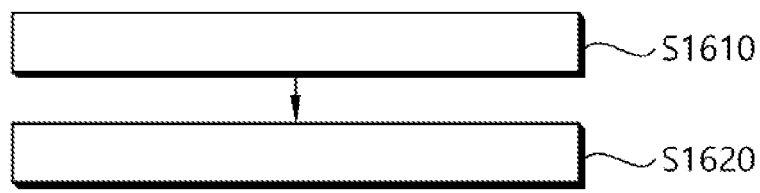
FIG. 16 shows a method for a base station to perform wireless communication, based on an embodiment of the present disclosure.

FIG. 16 shows a method for a base station to perform wireless communication, based on an embodiment of the present disclosure. The embodiment of FIG. 16 may be combined with various embodiments of the present disclosure.

Referring to FIG. 16, in step S1610, the base station may transmit, to a first device, information related to a first sidelink (SL) grant, information related to a first physical uplink control channel (PUCCH) resource, and information related to a maximum number of transmissions of a medium access control (MAC) protocol data unit (PDU). In step S1620, the base station may transmit, to the first device through a physical downlink control channel (PDCCH), a downlink control information (DCI) related to a SL hybrid automatic repeat request (HARQ) process ID. For example, the DCI may include information related to a second SL grant for retransmission of the MAC PDU and information related to a second PUCCH resource. For example, the MAC PDU may be transmitted by the first device to a second device, based on the first SL grant and the SL HARQ process ID. For example, a buffer related to the SL HARQ process ID may be flushed by the first device, based on a number of transmissions of the MAC PDU to the second device being reached the maximum number of transmissions. For example, based on the buffer related to the SL HARQ process ID being flushed, the first device may not transmit the MAC PDU to the second device based on the second SL grant, and the first device may not transmit SL HARQ feedback information related to the MAC PDU to the base station based on the second PUCCH resource.

The proposed method may be applied to the device(s) based on various embodiments of the present disclosure. First, the processor 202 of the base station 200 may control the transceiver 206 to transmit, to a first device, information related to a first sidelink (SL) grant, information related to a first physical uplink control channel (PUCCH) resource, and information related to a maximum number of transmissions of a medium access control (MAC) protocol data unit (PDU). In addition, the processor 202 of the base station 200 may control the transceiver 206 to transmit, to the first device through a physical downlink control channel (PDCCH), a downlink control information (DCI) related to a SL hybrid automatic repeat request (HARQ) process ID. For example, the DCI may include information related to a second SL grant for retransmission of the MAC PDU and information related to a second PUCCH resource. For example, the MAC PDU may be transmitted by the first device to a second device, based on the first SL grant and the SL HARQ process ID. For example, a buffer related to the SL HARQ process ID may be flushed by the first device, based on a number of transmissions of the MAC PDU to the second device being reached the maximum number of transmissions. For example, based on the buffer related to the SL HARQ process ID being flushed, the first device may not transmit the MAC PDU to the second device based on the second SL grant, and the first device may not transmit SL HARQ feedback information related to the MAC PDU to the base station based on the second PUCCH resource.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, information related to a first sidelink (SL) grant, information related to a first physical uplink control channel (PUCCH) resource, and information related to a maximum number of transmissions of a medium access control (MAC) protocol data unit (PDU); and transmit, to the first device through a physical downlink control channel (PDCCH), a downlink control information (DCI) related to a SL hybrid automatic repeat request (HARQ) process ID. For example, the DCI may include information related to a second SL grant for retransmission of the MAC PDU and information related to a second PUCCH resource. For example, the MAC PDU may be transmitted by the first device to a second device, based on the first SL grant and the SL HARQ process ID. For example, a buffer related to the SL HARQ process ID may be flushed by the first device, based on a number of transmissions of the MAC PDU to the second device being reached the maximum number of transmissions. For example, based on the buffer related to the SL HARQ process ID being flushed, the first device may not transmit the MAC PDU to the second device based on the second SL grant, and the first device may not transmit SL HARQ feedback information related to the MAC PDU to the base station based on the second PUCCH resource.

Based on an embodiment of the present disclosure, an apparatus configured to control a base station may be provided. For example, the apparatus may comprise: one or more processors; and one or more memories operably connected to the one or more processors and storing instructions. For example, the one or more processors may execute the instructions to: transmit, to a first UE, information related to a first sidelink (SL) grant, information related to a first physical uplink control channel (PUCCH) resource, and information related to a maximum number of transmissions of a medium access control (MAC) protocol data unit (PDU); and transmit, to the first UE through a physical downlink control channel (PDCCH), a downlink control information (DCI) related to a SL hybrid automatic repeat request (HARQ) process ID. For example, the DCI may include information related to a second SL grant for retransmission of the MAC PDU and information related to a second PUCCH resource. For example, the MAC PDU may be transmitted by the first UE to a second UE, based on the first SL grant and the SL HARQ process ID. For example, a buffer related to the SL HARQ process ID may be flushed by the first UE, based on a number of transmissions of the MAC PDU to the second UE being reached the maximum number of transmissions. For example, based on the buffer related to the SL HARQ process ID being flushed, the first UE may not transmit the MAC PDU to the second UE based on the second SL grant, and the first UE may not transmit SL HARQ feedback information related to the MAC PDU to the base station based on the second PUCCH resource.

Based on an embodiment of the present disclosure, a non-transitory computer-readable storage medium storing instructions may be provided. For example, the non-transitory computer-readable storage medium storing instructions, when executed, may cause a base station to: transmit, to a first device, information related to a first sidelink (SL) grant, information related to a first physical uplink control channel (PUCCH) resource, and information related to a maximum number of transmissions of a medium access control (MAC) protocol data unit (PDU); and transmit, to the first device through a physical downlink control channel (PDCCH), a downlink control information (DCI) related to a SL hybrid automatic repeat request (HARQ) process ID. For example, the DCI may include information related to a second SL grant for retransmission of the MAC PDU and information related to a second PUCCH resource. For example, the MAC PDU may be transmitted by the first device to a second device, based on the first SL grant and the SL HARQ process ID. For example, a buffer related to the SL HARQ process ID may be flushed by the first device, based on a number of transmissions of the MAC PDU to the second device being reached the maximum number of transmissions. For example, based on the buffer related to the SL HARQ process ID being flushed, the first device may not transmit the MAC PDU to the second device based on the second SL grant, and the first device may not transmit SL HARQ feedback information related to the MAC PDU to the base station based on the second PUCCH resource.

Based on various embodiments of the present disclosure, if the transmitting UE performs SL communication based on the SL CG allocated by the base station, and if the number of transmissions performed by the transmitting UE based on the SL CG reaches the maximum number of transmissions pre-configured for the UE, the UE may flush the buffer of the associated SL HARQ process. Furthermore, in this case, if the transmitting UE reports NACK information (received from the receiving UE) to the base station based on the PUCCH resource related to the SL CG, and if the base station allocates the DG for retransmission to the transmitting UE based on NACK information, the transmitting UE may ignore the retransmission resource(s) allocated by the DG, and the transmitting UE may not transmit HARQ feedback to the base station based on the PUCCH resource related to the DG. Herein, for example, the maximum number of transmissions may be configured for the UE for each SL CG.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
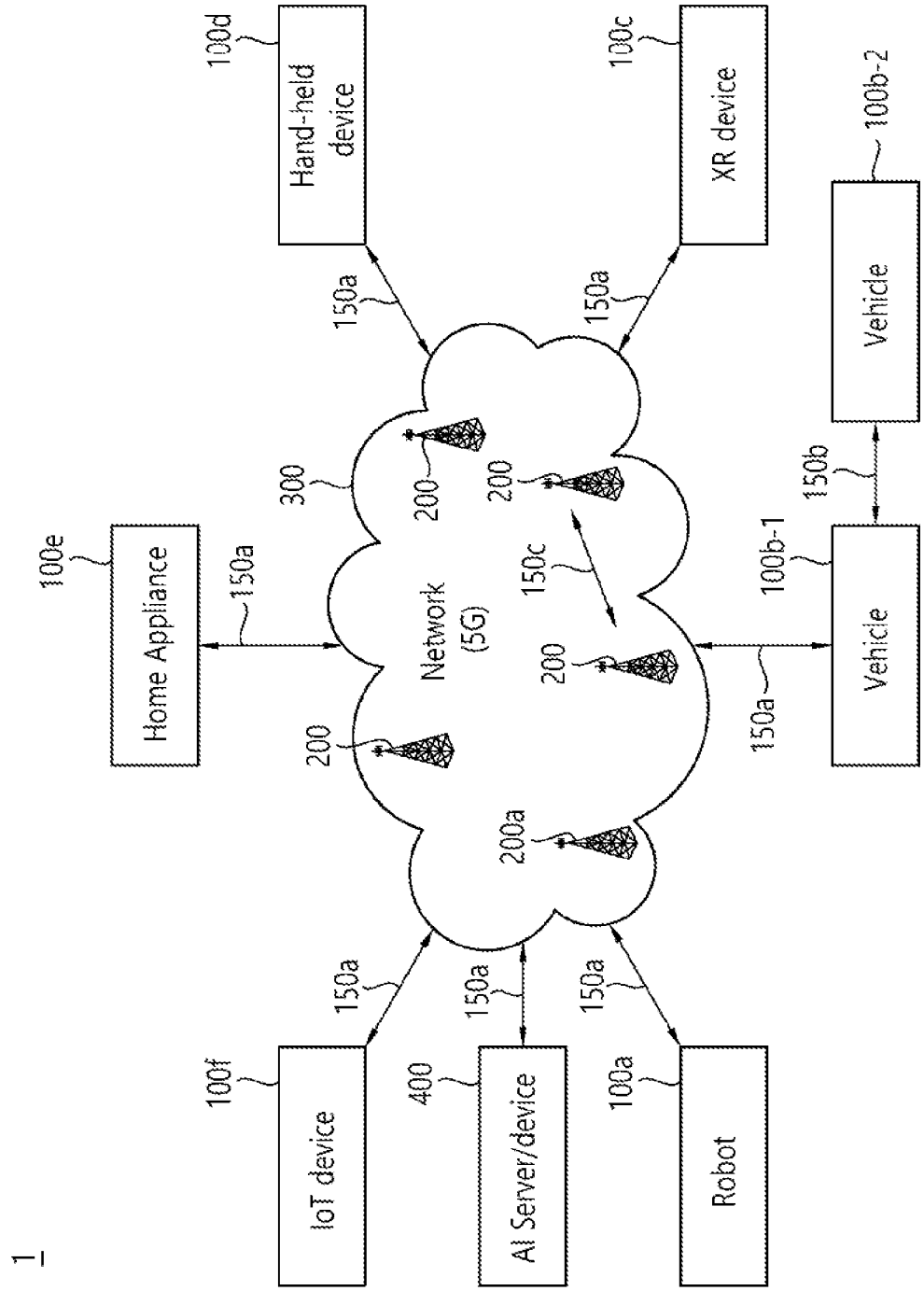
FIG. 17 shows a communication system 1, based on an embodiment of the present disclosure.

FIG. 17 shows a communication system 1, based on an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
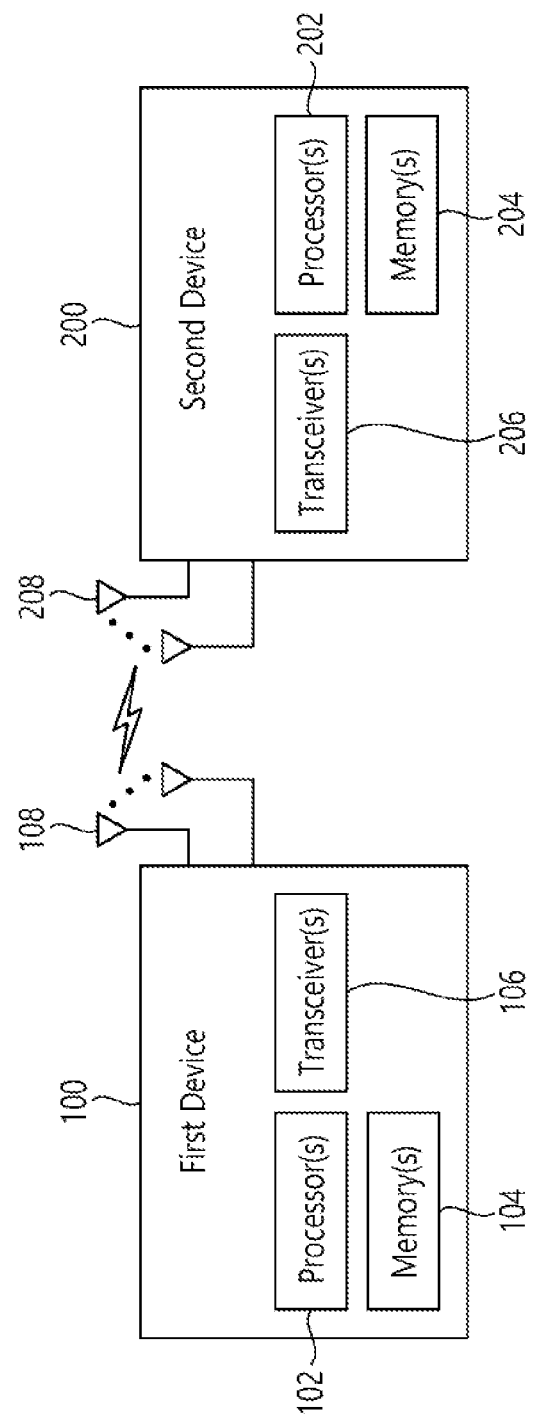
FIG. 18 shows wireless devices, based on an embodiment of the present disclosure.

FIG. 18 shows wireless devices, based on an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
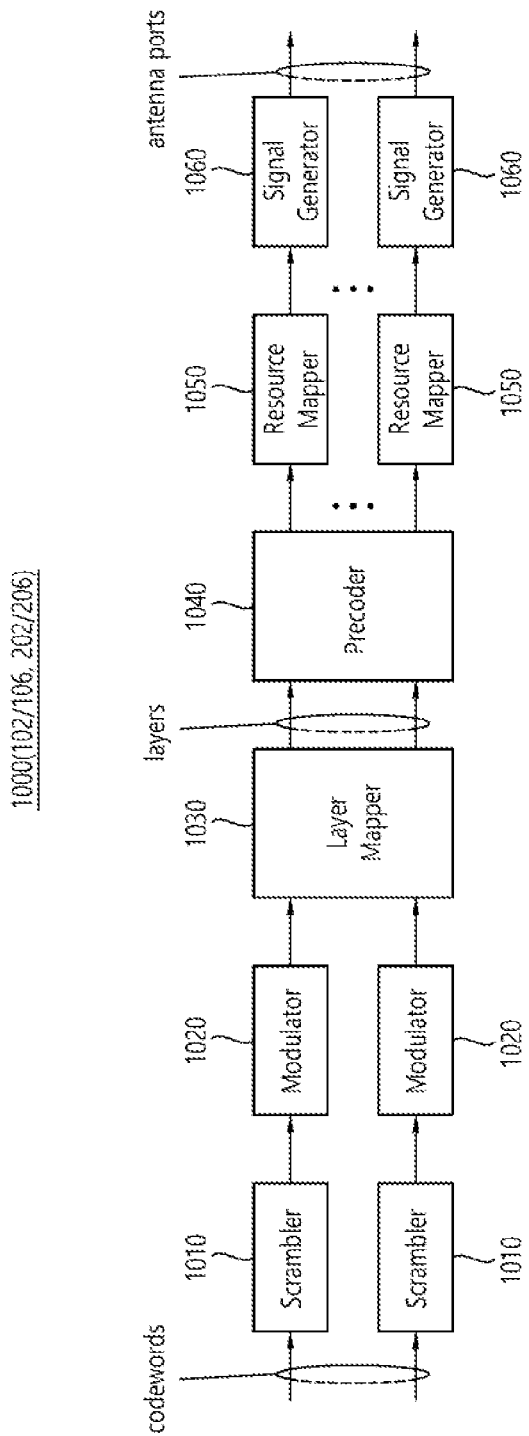
FIG. 19 shows a signal process circuit for a transmission signal, based on an embodiment of the present disclosure.

FIG. 19 shows a signal process circuit for a transmission signal, based on an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
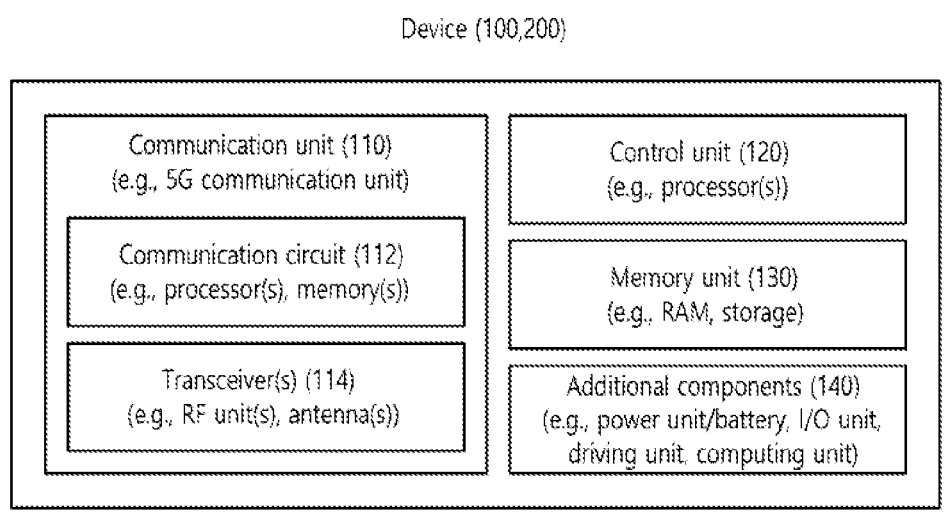
FIG. 20 shows another example of a wireless device, based on an embodiment of the present disclosure.

FIG. 20 shows another example of a wireless device, based on an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
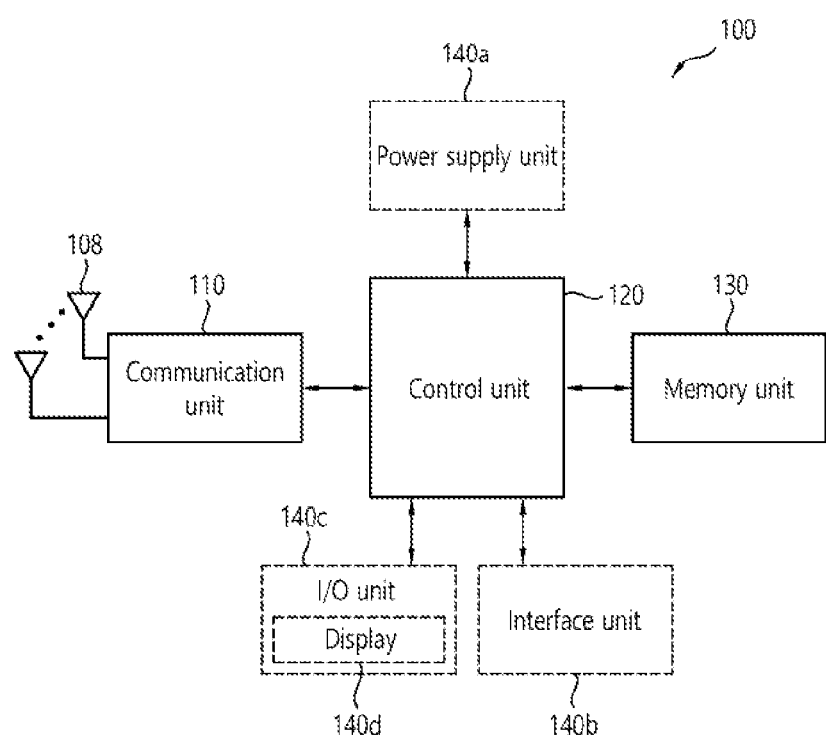
FIG. 21 shows a hand-held device, based on an embodiment of the present disclosure.

FIG. 21 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 22:
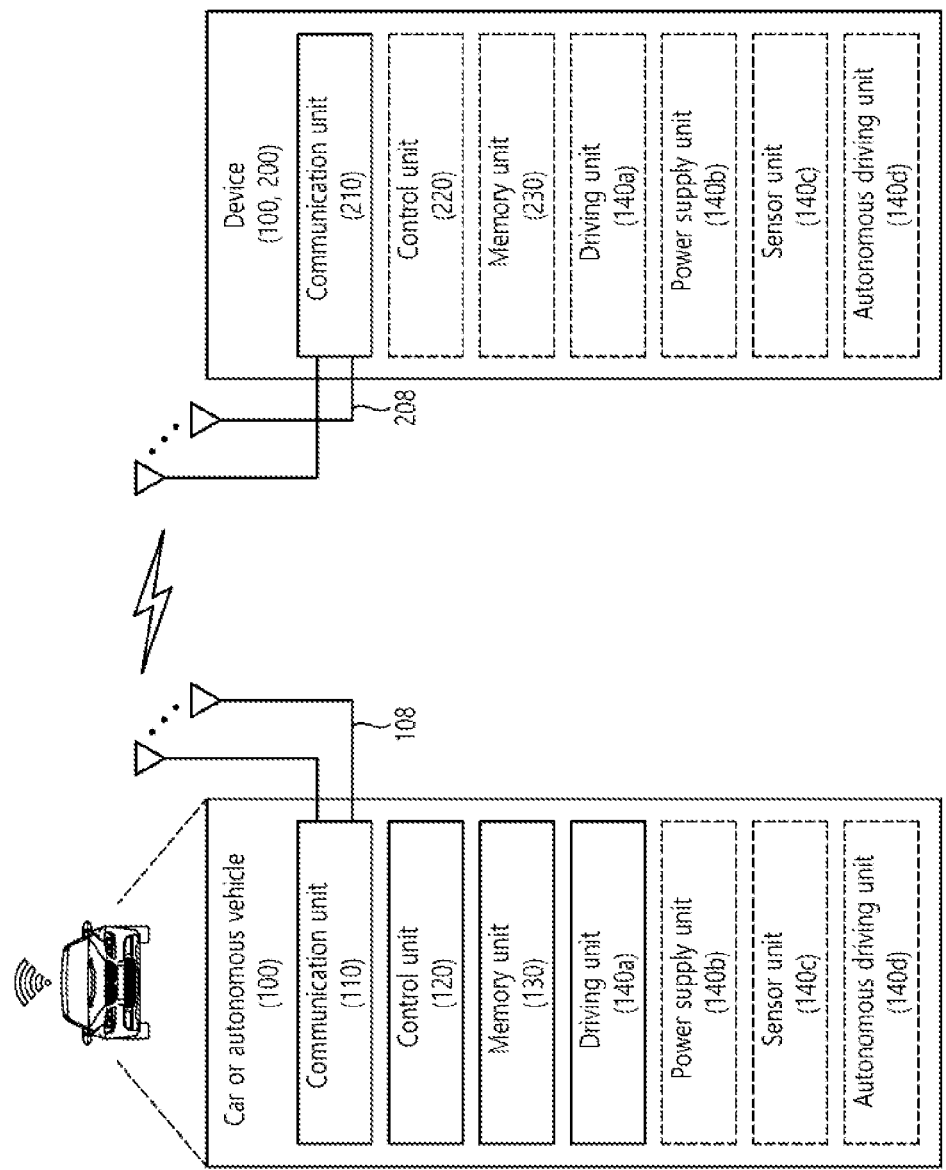
FIG. 22 shows a vehicle or an autonomous vehicle, based on an embodiment of the present disclosure.

FIG. 22 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
receiving, from a base station, information related to a maximum number of times that a medium access control (MAC) protocol data unit (PDU) can be transmitted using a first sidelink (SL) grant;
transmitting, to a second device, the MAC PDU based on the first SL grant and a SL process;
flushing a hybrid automatic repeat request (HARQ) buffer related to the SL process, based on that a number of transmissions of the MAC PDU has been reached to the maximum number of times;
receiving, from the base station through a physical downlink control channel (PDCCH), a second SL grant for retransmission of the MAC PDU, wherein the second SL grant is related to the SL process of which the HARQ buffer is empty; and
ignoring the second sidelink grant, based on the second SL grant related to the SL process of which the HARQ buffer is empty.

2. The method of claim 1, wherein the first device skips SL HARQ feedback transmission related to the MAC PDU based on a physical uplink control channel (PUCCH) resource related to the second sidelink grant.

3. The method of claim 1, wherein the SL process is related to a SL process ID related to the MAC PDU, and the SL process ID is transmitted to the second device based on a sidelink control information (SCI) transmitted through a physical sidelink shared channel (PSSCH).

4. The method of claim 1, wherein the first SL grant is a SL configured grant (CG), and the SL CG is one of a first type SL CG or a second type SL CG.

5. The method of claim 1, further comprising:
transmitting, to the base station, negative acknowledgement (NACK) information related to the MAC PDU based on a PUCCH resource related to the first SL grant,
wherein the second SL grant is received from the base station based on the NACK information.

6. The method of claim 1, further comprising:
transmitting, to the base station, acknowledgement (ACK) information related to the MAC PDU, based on that the number of transmissions of the MAC PDU has been reached to the maximum number.

7. The method of claim 1, wherein, based on the first device which receives ACK information related to the MAC PDU from the second device through a physical sidelink feedback channel (PSFCH), the HARQ buffer related to the SL process is flushed.

8. The method of claim 1, wherein, based on the first device which transmits ACK information related to the MAC PDU to the base station, the HARQ buffer related to the SL process is flushed.

9. The method of claim 1, wherein, based on the first device which sets a field related to HARQ feedback in a SCI related to the MAC PDU that reaches the maximum number to enable, the HARQ buffer related to the SL process is flushed.

10. The method of claim 1, wherein, based on (i) the first device which transmits NACK information related to the MAC PDU to the base station and (ii) downlink control information (DCI) related to the second SL grant including a toggled new data indicator (NDI), the HARQ buffer related to the SL process is flushed.

11. The method of claim 1, wherein, based on (i) the first device which transmits ACK information related to the MAC PDU to the base station and (ii) downlink control information (DCI) related to the second SL grant including an un-toggled new data indicator (NDI), the HARQ buffer related to the SL process is flushed.

12. The method of claim 1, wherein the maximum number is determined based on at least one priority of at least one logical channel related to the MAC PDU.

13. The method of claim 12, wherein the maximum number is related to a highest priority among the at least one priority of the at least one logical channel.

14. A first device adapted to perform wireless communication, the first device comprising:
at least one transceiver;
at least one processor; and
at least one memory connected to the at least one processor and storing instructions that, based on being executed by the at least one processor, perform operations comprising:
controlling the at least one transceiver to receive, from a base station, information related to a maximum number of times that a medium access control (MAC) protocol data unit (PDU) can be transmitted using a first sidelink (SL) grant;
controlling the at least one transceiver to transmit, to a second device, the MAC PDU based on the first SL grant and a SL process;
flushing a hybrid automatic repeat request (HARM) buffer related to the SL process, based on that a number of transmissions of the MAC PDU has been reached to the maximum number of times;
controlling the at least one transceiver to receive, from the base station through a physical downlink control channel (PDCCH), a second SL grant for retransmission of the MAC PDU, wherein the second SL grant is related to the SL process of which the HARQ buffer is empty; and
ignoring the second sidelink grant, based on the second SL grant related to the SL process of which the HARQ buffer is empty.

15. The first device of claim 14, wherein the first device skips SL HARQ feedback transmission related to the MAC PDU based on a physical uplink control channel (PUCCH) resource related to the second sidelink grant.

16. The first device of claim 14, wherein the SL process is related to a SL process ID related to the MAC PDU, and the SL process ID is transmitted to the second device based on a sidelink control information (SCI) transmitted through a physical sidelink shared channel (PSSCH).

17. The first device of claim 14, wherein the first SL grant is a SL configured grant (CG), and the SL CG is one of a first type SL CG or a second type SL CG.

18. The first device of claim 14, wherein the one or more processors further execute the instructions to control the one or more transceivers to transmit, to the base station, negative acknowledgement (NACK) information related to the MAC PDU based on a PUCCH resource related to the first SL grant, and
wherein the information related to the second SL grant is received from the base station based on the NACK information.

19. The first device of claim 14, wherein the one or more processors further execute the instructions to control the one or more transceivers to transmit, to the base station, acknowledgement (ACK) information related to the MAC PDU, based on that the number of transmissions of the MAC PDU has been reached to the maximum number.

20. A processing device adapted to control a first device, the processing device comprising:
- at least one processor; and
- at least one memory connected to the at least one processor and storing instructions that, based on being executed by the at least one processor, perform operations comprising:
- receiving, from a base station, information related to a maximum number of times that a medium access control (MAC) protocol data unit (PDU) can be transmitted using a first sidelink (SL) grant;
- transmitting, to a second device, the MAC PDU based on the first SL grant and a SL process;
- flushing a hybrid automatic repeat request (HARQ) buffer related to the SL process, based on that a number of transmissions of the MAC PDU has been reached to the maximum number of times;
- receive, from the base station through a physical downlink control channel (PDCCH), a second SL grant for retransmission of the MAC PDU, wherein the second SL grant is related to the SL process of which the HARQ buffer is empty; and
- ignore the second sidelink grant, based on the second SL grant related to the SL process of which the HARQ buffer is empty.

* * * * *